United States Patent
Christopher et al.

(10) Patent No.: US 9,703,611 B1
(45) Date of Patent: Jul. 11, 2017

(54) ISOLATING RESOURCES FOR UTILIZATION BY TENANTS EXECUTING IN MULTI-TENANT SOFTWARE CONTAINERS

(71) Applicant: Amazon Technologies, Inc., Seattle, WA (US)

(72) Inventors: Keian Christopher, Seattle, WA (US); Kevin Michael Beranek, Seattle, WA (US); Christopher Keakini Kaulia, Seattle, WA (US); Vijay Ravindra Kulkarni, Seattle, WA (US); Samuel Leonard Moniz, Seattle, WA (US); Kyle Bradley Peterson, Seattle, WA (US); Ajit Ashok Varangaonkar, Kirkland, WA (US); Jun Xu, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 165 days.

(21) Appl. No.: 14/222,564

(22) Filed: Mar. 21, 2014

(51) Int. Cl.
  *G06F 9/46* (2006.01)
  *G06F 9/50* (2006.01)
  *G06F 11/07* (2006.01)

(52) U.S. Cl.
  CPC .......... *G06F 9/5083* (2013.01); *G06F 9/5027* (2013.01); *G06F 11/0712* (2013.01); *G06F 9/5061* (2013.01); *G06F 9/5072* (2013.01); *G06F 9/5077* (2013.01)

(58) Field of Classification Search
  None
  See application file for complete search history.

(56) References Cited

U.S. PATENT DOCUMENTS

| | | | |
|---|---|---|---|
| 6,915,511 B2 | 7/2005 | Susarla et al. | |
| 7,127,713 B2 * | 10/2006 | Davis | H04L 63/0227 717/177 |
| 7,406,687 B1 | 7/2008 | Daynes et al. | |
| 7,617,264 B1 * | 11/2009 | Garthwaite | G06F 12/0261 707/999.002 |

(Continued)

OTHER PUBLICATIONS

U.S. Appl. No. 14/222,565, filed Mar. 21, 2014, Christopher et al.

(Continued)

*Primary Examiner* — Abu Ghaffari
(74) *Attorney, Agent, or Firm* — Lee & Hayes, PLLC

(57) ABSTRACT

Technologies are described herein for isolating tenants executing in a multi-tenant software container. Mechanisms for resource isolation allow tenants executing in a multi-tenant software container to be isolated in order to prevent resource starvation by one or more of the tenants. Mechanisms for dependency isolation may be utilized to prevent one tenant executing in a multi-tenant software container from using another tenant in the same container in a manner that requires co-tenancy. Mechanisms for security isolation may be utilized to prevent one tenant in a multi-tenant software container from accessing protected data or functionality of another tenant. Mechanisms for fault isolation may be utilized to prevent tenants in a multi-tenant software container from causing faults or other types of errors that affect other tenants executing in the same software container.

20 Claims, 17 Drawing Sheets

PER TENANT ISOLATION OF
FILE DESCRIPTOR
UTILIZATION

(56) References Cited

U.S. PATENT DOCUMENTS

| | | | |
|---|---|---|---|
| 7,933,869 B2 | 4/2011 | Becker et al. | |
| 7,954,096 B2 | 5/2011 | Atsatt | |
| 8,589,947 B2 | 11/2013 | Potter et al. | |
| 8,719,415 B1* | 5/2014 | Sirota | G06F 9/5061 709/221 |
| 8,775,862 B2 | 7/2014 | Rueegg et al. | |
| 8,966,464 B1 | 2/2015 | Christopher et al. | |
| 8,973,136 B2* | 3/2015 | Shilimkar | G06F 21/566 713/164 |
| 9,098,333 B1* | 8/2015 | Obrecht | G06F 11/30 |
| 9,104,458 B1* | 8/2015 | Brandwine | G06F 9/45558 |
| 9,250,951 B2 | 2/2016 | Haikney et al. | |
| 9,372,735 B2* | 6/2016 | Calder | G06F 9/5077 |
| 9,451,012 B1* | 9/2016 | Neill | H04L 67/1012 |
| 9,471,353 B1* | 10/2016 | Christopher | G06F 9/44521 |
| 2004/0015936 A1 | 1/2004 | Susarla et al. | |
| 2005/0228879 A1* | 10/2005 | Cherkasova | G06F 9/505 709/224 |
| 2005/0262100 A1 | 11/2005 | Piper | |
| 2008/0270987 A1 | 10/2008 | Weissman | |
| 2009/0112952 A1* | 4/2009 | Adams, III | G06F 12/0276 |
| 2010/0077395 A1 | 3/2010 | Edwards et al. | |
| 2010/0107162 A1 | 4/2010 | Edwards et al. | |
| 2010/0125834 A1* | 5/2010 | Matic | G06F 11/3636 717/125 |
| 2010/0138830 A1* | 6/2010 | Astete | G06F 9/45533 718/1 |
| 2010/0211548 A1* | 8/2010 | Ott | G06F 17/30575 707/655 |
| 2011/0191759 A1 | 8/2011 | Andrade et al. | |
| 2011/0213870 A1 | 9/2011 | Cai et al. | |
| 2012/0047570 A1 | 2/2012 | Chan et al. | |
| 2012/0136602 A1 | 5/2012 | Hossain et al. | |
| 2012/0144374 A1 | 6/2012 | Gallagher et al. | |
| 2012/0159517 A1 | 6/2012 | Shen et al. | |
| 2012/0159523 A1 | 6/2012 | Kulkarni et al. | |
| 2012/0174085 A1 | 7/2012 | Driesen et al. | |
| 2012/0324069 A1 | 12/2012 | Nori et al. | |
| 2013/0066770 A1 | 3/2013 | Das et al. | |
| 2013/0081109 A1 | 3/2013 | Venkataraman et al. | |
| 2013/0179880 A1* | 7/2013 | Edholm | G06F 9/45558 718/1 |
| 2013/0205028 A1 | 8/2013 | Crockett et al. | |
| 2013/0318512 A1 | 11/2013 | Kuppala et al. | |
| 2013/0325912 A1* | 12/2013 | Corrie | G06F 12/0253 707/813 |
| 2014/0019745 A1 | 1/2014 | Dodgson et al. | |
| 2014/0075567 A1* | 3/2014 | Raleigh | H04W 12/10 726/26 |
| 2014/0108346 A1 | 4/2014 | Pinkney et al. | |
| 2014/0137179 A1 | 5/2014 | Christodorescu et al. | |
| 2014/0137181 A1 | 5/2014 | Christodorescu et al. | |
| 2014/0282586 A1* | 9/2014 | Shear | G06F 9/5072 718/104 |
| 2014/0298091 A1 | 10/2014 | Carlen et al. | |
| 2015/0033072 A1 | 1/2015 | Barr et al. | |
| 2015/0134887 A1* | 5/2015 | Liang | G06F 12/0246 711/103 |
| 2015/0139238 A1 | 5/2015 | Pourzandi et al. | |
| 2015/0142856 A1 | 5/2015 | Salinas et al. | |
| 2015/0229629 A1 | 8/2015 | Ishaya et al. | |
| 2015/0256483 A1* | 9/2015 | Bragstad | H04L 43/04 709/219 |
| 2015/0271180 A1 | 9/2015 | Christodorescu et al. | |
| 2016/0006767 A1 | 1/2016 | Lain et al. | |

OTHER PUBLICATIONS

U.S. Appl. No. 14/222,566, filed Mar. 21, 2014, Christopher et al.
U.S. Appl. No. 14/222,568, filed Mar. 21, 2014, Christopher et al.
U.S. Appl. No. 13/592,922, filed Aug. 23, 2012, Ramalingam et al.
U.S. Appl. No. 13/791,193, filed Mar. 8, 2013, Ramalingam et al.
U.S. Appl. No. 13/800,783, filed Mar. 13, 2013, Trautmann et al.
Web Article: "Realm Configuration How-To", published by Apache [online][retrieved on: Mar. 10, 2014] retrieved from: tomcat.apache.org/tomcat-7.0-doc/realm-howto.html , 16 pps.
Office action for U.S. Appl. No. 14/222,568, mailed on Apr. 15, 2016, Christopher et al., "Isolating Tenants Executing in Multi-Tenant Software Containers", 7 pages.
Bussani et al., "Trusted Virtual Domains: Secure Foundations for Business and IT Services", IBM Research Report, Computer Science, 2005, 14 pages.
Cabuk et al., "Towards automated security policy enforcement in multi-tenant virtual data centers", Journal of Computer Security, IOS Press, vol. 18, 2010, 33 pages.
Office action for U.S. Appl. No. 14/222,566, mailed on Feb. 23, 2016, Christopher et al., "Isolating Tenants Executing in Multi-Tenant Software Containers", 10 pages.
Tang et al., "A New RBAC Based Access Control Model for Cloud Computing", Springer-Verlag Berlin Heidelberg, 2012, 10 pages.
Office action for U.S. Appl. No. 14/222,566, mailed on Aug. 8, 2016, Christopher et al., "Isolating Tenants Executing in Multi-Tenant Software Containers", 12 pages.
Office action for U.S. Appl. No. 14/222,566, mailed on Nov. 17, 2016, Christopher et al., "Isolating Tenants Executing in Multi-Tenant Software Containers", 15 pages.
Office action for U.S. Appl. No. 14/222,568, mailed on Nov. 10, 2015, Christopher et al., "Isolating Tenants Executing in Multi-Tenant Software Containers", 9 pages.
Office action for U.S. Appl. No. 13/592,922, mailed on Dec. 15, 2014, Ramalingam et al, "Optimized Deployment and Execution Programs in a Distributed Computing Environment", 17 pages.

* cited by examiner

PER TENANT ISOLATION OF
THREAD CREATION

PER TENANT ISOLATION OF
DISK UTILIZATION

ISOLATING RESOURCES FOR UTILIZATION BY TENANTS EXECUTING IN MULTI-TENANT SOFTWARE CONTAINERS

BACKGROUND

Various types of execution environments can be utilized to execute software applications. Execution environments can provide functionality for not only executing applications, but also for managing application execution and for providing other types of functionality. For example, one type of execution environment is a software container. Software containers typically provide functionality for loading application dependencies, interconnecting applications at run time, and for managing application lifecycles, including integrated application deployment and eviction. Standard configuration mechanisms can typically be utilized to access this functionality.

Executing programs in an execution environment, such as a software container, may provide benefits over executing applications using traditional application architectures. For example, executing applications in a software container might permit applications to be constructed and deployed in a modular fashion by deploying the modules to a software container independently and interconnecting the modules at run time. Executing applications in a software container might also permit multiple applications, which may be referred to herein as "tenants," to execute in the same multi-tenant software container, thereby sharing common frameworks in memory and potentially reducing resource utilization.

Because multi-tenant software containers provide functionality for hosting multiple tenants, multi-tenant software containers typically also provide mechanisms to isolate different tenants from one another. For simple tenants, the basic level of isolation provided by a software container may be sufficient. For software operating in a high-performance, latency sensitive, secure, highly available environment, however, this model may be lacking. For example, a tenant executing in a multi-tenant software container may consume so many resources that it can starve other tenants executing in the software container or even take down the software container. A tenant executing in a multi-tenant software container might also access protected data owned by another tenant, or handle failure improperly and take down the entire software container.

It is with respect to these and other considerations that the disclosure made herein is presented.

DETAILED DESCRIPTION

Figure 1:
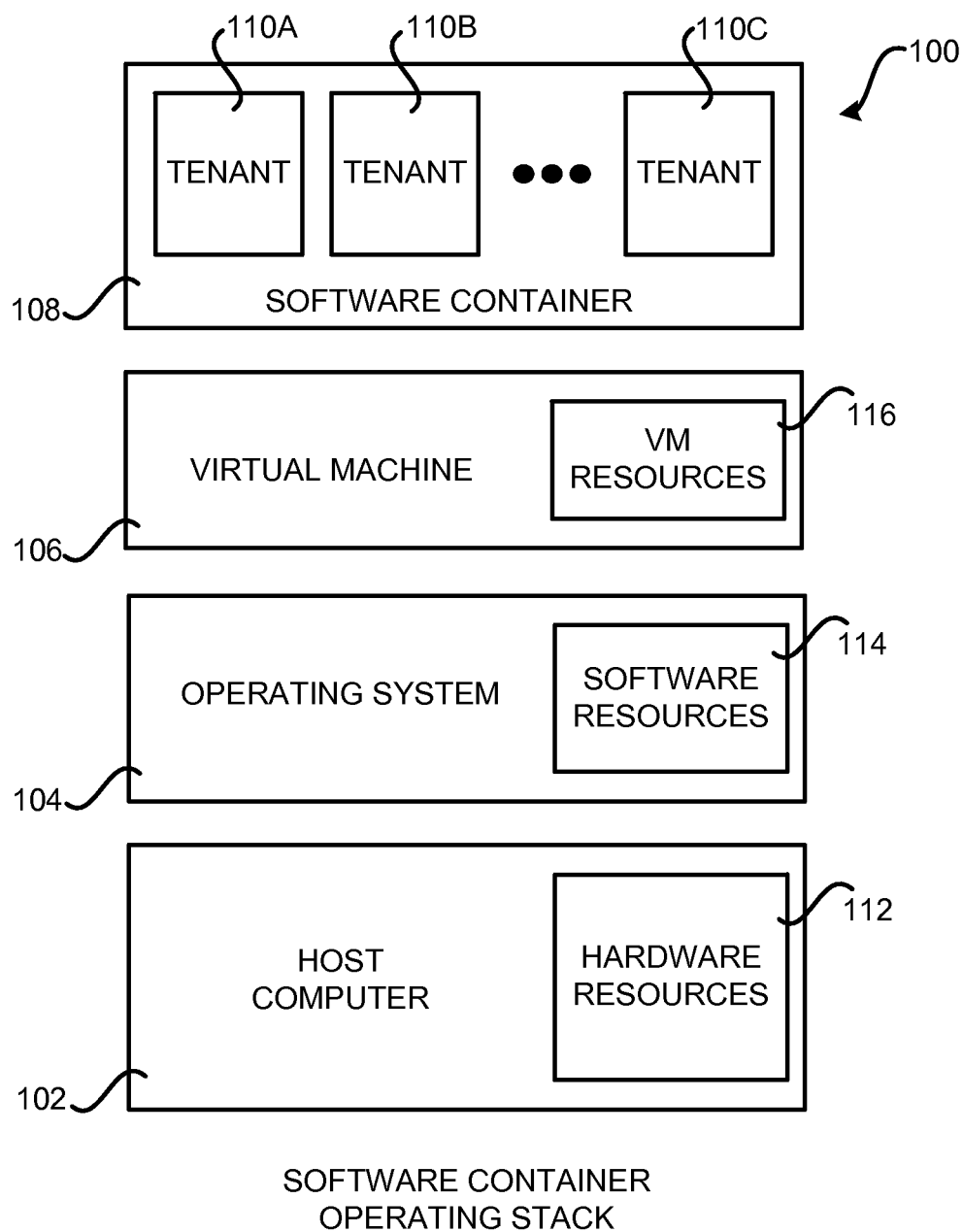
FIG. 1 is a stack diagram showing aspects of one illustrative operating environment for the embodiments disclosed herein for isolating tenants executing in a multi-tenant software container.

The following detailed description is directed to technologies for isolating tenants executing in multi-tenant software containers. In particular, mechanisms for resource isolation are provided that, among other things, allow tenants executing in a multi-tenant software container to be isolated in order to prevent resource starvation by one or more of the tenants. Mechanisms for dependency isolation are also provided that may be utilized to prevent one tenant executing in a multi-tenant software container from using another tenant in the same container in a manner that requires co-tenancy. Mechanisms for security isolation are also provided that may be utilized to prevent one tenant in a multi-tenant software container from accessing protected data or functionality of another tenant. Mechanisms are also provided for fault isolation that may be utilized to prevent tenants in a multi-tenant software container from being affected by the failure of another tenant in the same software container.

As discussed briefly above, the mechanisms disclosed herein may be implemented in conjunction with a software container (which might also be called a "Web container", "an application container", a "servlet container", or an "application server"). As also mentioned briefly above, a software container can provide functionality for executing applications, loading application dependencies, interconnecting applications at run time, for managing application lifecycles, including integrated application deployment and eviction, and other types of functionality. A multi-tenant software container is a software container configured to execute applications in process on behalf of two or more tenants. It should be appreciated that while the embodiments disclosed herein are primarily presented in the context of a multi-tenant software container, the embodiments disclosed herein might also be utilized with other types of multi-tenant execution environments.

As also described briefly above, a tenant executing in a multi-tenant software container may consume a disproportionate amount of computing resources, such that it starves other tenants executing in the software container for resources, or even takes down the software container. In order to address this consideration, and potentially others, mechanisms are provided herein for resource isolation that, among other things, allow tenants executing in a multi-tenant software container to be isolated in order to prevent resource starvation by one or more of the tenants.

As used herein, the term "resource" includes, but is not limited to, disk space, central processing unit ("CPU") cycles, system memory, heap and garbage collection occurrences, disk input/output ("I/O") operations and bandwidth, network I/O operations and bandwidth, virtual IP ("load balancer") connections, file descriptor count, and execution threads. For each of these resource types, and potentially others, various mechanisms might be utilized to isolate the resource utilization of a tenant and to prevent the tenant from resource starvation of other tenants executing in the same multi-tenant software container.

The resource isolation mechanisms disclosed herein might be implemented at various locations within the software stack utilized to execute the tenants. For example, and without limitation, these mechanisms might be implemented within the tenants themselves, within a software container, within a classloader, within an operating system, within a virtual machine, and/or at other locations within the software stack utilized to execute the tenants. Mechanisms that may be utilized to determine the amount of resources utilized by tenants in the same container include, but are not limited to, bytecode weaving, interception, tracing, heap dumps, and shadow environments. Other techniques might also be utilized to determine the amount of resources utilized by each of the tenants executing in a multi-tenant software container.

Various types of actions might also be taken with regard to a tenant utilizing a disproportionate amount of resources. For example, and without limitation, a resource request might be denied, a tenant might be evicted from the software container, a tenant might be allocated fewer CPU cycles, and/or the execution of a tenant might be paused and/or throttled. Per tenant resource use limits and/or resource utilization thresholds might be utilized to determine when a particular tenant has utilized, or is about to utilize, an undesirable amount of a resource. Additional details regarding the mechanisms disclosed herein for resource isolation of tenants executing in a multi-tenant software container will be provided below with regard to FIGS. 2A-3.

Mechanisms are also disclosed herein for dependency isolation that may be utilized to prevent one tenant executing in a multi-tenant software container from using another tenant in the same container in a manner that requires co-tenancy. In particular, a mechanism is disclosed herein for dependency isolation of tenants in a software container utilizing tenant and container classloaders. In particular, tenants executing in a multi-tenant software container are associated with individual tenant classloaders for loading non-shared classes on behalf of the tenants. When a tenant classloader receives a request from its associated tenant to load a class, the tenant classloader determines whether the class is a class that is shared with other tenants in the same multi-tenant software container. Various mechanisms might be utilized to determine if the class to be loaded is a shared class.

If the class to be loaded is not a shared class, the tenant classloader loads the class on behalf of the requesting tenant. The tenant classloader might also be configured to perform bytecode weaving on the loaded class at load time. If, however, the class to be loaded is a shared class, the tenant class loader delegates loading of the shared class to a container classloader. The container classloader, in turn, loads the shared class. The container classloader is configured to allow two or more tenants to utilize the same class definition. Instances of the class created by the tenants, however, are maintained separately from one another. In this way, each tenant cannot access a class instance created by another tenant. The container classloader might also be configured to perform bytecode weaving on the loaded class at load time. Other mechanisms for dependency isolation of tenants executing in a multi-tenant software container may also be utilized. Additional details regarding the mechanisms disclosed herein for dependency isolation of tenants executing in a multi-tenant software container will be provided below with regard to FIGS. 4A, 4B, 5A and 5B.

Mechanisms are also disclosed herein for security isolation that may be utilized to prevent one tenant in a multi-tenant software container from accessing protected data or functionality of another tenant. In one implementation of these mechanisms, the tenants of a multi-tenant software container are assigned individual trusted identities. For example, in one implementation a trusted identity and access policy management ("TIAPM") service external to the multi-tenant software container assigns a trusted identity to each of the tenants for which security isolation is desirable. The TIAPM service might also maintain an access policy, or policies, that defines the components that are authorized to access the tenants, other services external to the software container and, potentially, host resources (e.g. operating system resources), container resources, and/or virtual machine resources. The TIAPM service might also maintain access policies for other systems and components.

The TIAPM service might also provide the access policies to various components that are configured to enforce the policies. For example, in one embodiment, a framework within the software container is configured to enforce an access policy for accessing the tenants of the multi-tenant software container. In another embodiment, the tenants themselves may be configured with functionality for identity-based access control, thereby permitting the tenants themselves to enforce their own access policies. The TIAPM service might also provide an access policy, or policies, to other services external to the software container that may be called by the tenants of the multi-tenant software container. Additionally, the access policy might be provided to a component, such as a security manager, tasked with enforcing an access policy associated with host resources.

When a tenant generates a request to access another tenant in the multi-tenant software container, or another container, the tenant includes their associated trusted identity with the request. The trusted identity can then be utilized, along with the relevant access policy, to determine if the tenant's request can be granted. For example, if the request is to a second tenant in the same multi-tenant application container, a framework in the container or the second tenant itself may utilize the trusted identity of the requesting tenant and an access policy associated with the second tenant to determine if the request should be granted.

A tenant might also make a request to access a service outside the multi-tenant container that includes the trusted identity associated with the tenant. The service will utilize the tenant's trusted identity and an appropriate access policy to determine whether the request can be granted. In a similar fashion, a tenant may request to access or otherwise utilize host resources, container resources, and/or virtual machine resources. A framework, security manager, or other type of component may utilize the tenant's trusted identity and an access policy associated with the host resources, container resources, and/or virtual machine resources to determine if the request can be granted.

Incoming requests directed to tenants of the multi-tenant software container might also include a trusted identity associated with a calling client. In this case, the trusted identity of the calling client and an access policy associated with the called tenant can be utilized to determine whether the incoming request should be permitted or denied. Other mechanisms for security isolation of tenants executing in a multi-tenant software container might also be utilized. Additional details regarding the mechanisms disclosed herein for security isolation of tenants executing in a multi-tenant software container will be provided below with regard to FIGS. 6A, 6B and 7.

Mechanisms are also disclosed herein for fault isolation that may be utilized to prevent tenants in a multi-tenant software container from causing a fault, and/or taking other types of actions, that negatively impact another tenant executing in the same software container. In particular, mechanisms may be implemented for preventing a tenant from shutting down the software container, a virtual machine, an operating system, or a host computer if such a shutdown would impact other currently executing tenants. The number of active releases of each tenant in a software container might also be limited, thereby reducing the possibility that a tenant will consume a disproportionate amount of memory and cause a fault that impacts other tenants. Tenants' ability to execute native code might also be restricted, thereby preventing tenants from launching processes outside of the software container that may consume significant memory and/or cause other types of faults.

In order to limit tenants' usage of memory, an inactive tenant might also be dynamically unloaded based upon the utilization of the tenant. For example, a tenant that is inactive might be swapped to disk to reduce memory usage by the software container. If a request is received for the tenant, the tenant may be reloaded and executed in order to respond to the request. Other mechanisms might also be utilized to reduce the possibility of a fault caused by excessive memory utilization of a software container.

Errors generated by a tenant that might cause a fault impacting other tenants might also be intercepted. The context of an intercepted error might then be determined based upon a stack trace and/or other information. A determination may then be made as to whether to permit or prohibit the error from being generated based upon the context of the error.

In some embodiments, tenants might be prevented from utilizing the same Uniform Resource Identifier ("URI") in order to prevent routing conflicts that might generate a fault. Tenants might also be prevented from passing objects to one another that are mutable. Additionally, tenants might be prevented from making changes to the configuration of the software container, a virtual machine, an operating system, and/or a host computer. In this way, the tenants can be prevented from making configuration changes that might induce a fault that affects other tenants of the software container. Other mechanisms for fault isolation of tenants executing in a multi-tenant software container might also be utilized. Additional details regarding the mechanisms disclosed herein for fault isolation of tenants executing in a multi-tenant software container will be provided below with regard to FIGS. 8-11.

It should be appreciated that the subject matter presented herein may be implemented as a computer process, an electronic computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Operating Environment

FIG. 1 is a stack diagram showing aspects of an operating environment 100 for the mechanisms disclosed herein for isolating tenants executing in a multi-tenant software container, including several software and hardware components utilized in embodiments disclosed herein. As shown in FIG. 1, the operating environment 100 includes a host computer 102 that may be utilized to execute an operating system 104. A virtual machine 106 and a multi-tenant software container 108 (which might be referred to herein as "a container" or "a software container") are also provided that execute on the operating system 104. Multiple tenants 110A-110C (which may be referred to herein as "a tenant 110" or "the tenants 110") may be executed concurrently within the software container 108. The tenants 110 execute as threads in a process that executes the software container 108. The mechanisms disclosed herein provide functionality for isolating tenant threads that are executing in the same multi-tenant container process.

As mentioned above, the software container 108 might provide functionality for executing applications, loading application dependencies, interconnecting applications at run time, managing application lifecycles including integrated application deployment and eviction, multi-tenant execution, and other types of functionality. It should be appreciated that while the embodiments disclosed herein are primarily presented in the context of a software container 108, the embodiments disclosed herein might also be utilized with other types of containers and execution environments.

It should be appreciated that software containers are available for use in many development and execution environments. For example, software containers are commonly available that utilize the JAVA programming language from ORACLE CORPORATION. Examples of software containers include, but are not limited to WEBSPHERE from IBM CORPORATION, SPRING FRAMEWORK from VMWARE CORPORATION, GUICE from GOOGLE CORPORATION, the PICOCONTAINER and PLEXUS projects from CODEHAUS, the FELIX, TOMCAT, TOMEE and GERONIMO projects from the APACHE SOFTWARE FOUNDATION, EQUINOX, GEMINI, JETTY and ECLIPSE from the ECLIPSE FOUNDATION, JBOSS from REDHAT CORPORATION, and GLASSFISH, WEBLOGIC, and FUSION from ORACLE CORPORATION. Although the embodiments disclosed herein are primarily presented in the context of a software container 108, the embodiments disclosed herein might also be utilized with other types of containers and with other types of execution environments.

As shown in FIG. 1, the host computer 102 provides various hardware resources 112 that may be utilized by the tenants 110 executing in the software container 108. For example, and without limitation, hardware resources 112 include, but are not limited to, CPU cycles, system memory, mass storage, disk I/O and bandwidth, and network I/O and bandwidth. The host computer 102 might also provide other types of hardware resources 112 for utilization by the tenants 110.

As also shown in FIG. 1, the operating system 104 might provide various types of software resources 114 for use by the tenants 110. For example, and without limitation, the software resources 114 include, but are not limited to, load balancer connections, file descriptors, and other types of software resources 114. The virtual machine 106 might also provide virtual machine resources 116 for use by the tenants 110. For example, and without limitation, the virtual machine resources 116 include, but are not limited to, heap, old generation, young generation, permanent generation, code cache, and execution threads. Other types of virtual machine resources 116 might also be provided.

It should be appreciated that the hardware resources 112, software resources 114, and virtual machine resources 116 (collectively "resources") described above are merely illustrative. In this regard it should also be appreciated that the embodiments disclosed herein may be utilized to provide isolation with respect to other types of resources not specifically identified herein. It should be further appreciated that the operating environment 100 illustrated in FIG. 1 is merely illustrative and that the embodiments disclosed herein might be utilized in other types of operating environments and with other types of containers.

Resource Isolation

As discussed briefly above, mechanisms are disclosed herein for resource isolation that, among other things, allow tenants 110 executing in a multi-tenant software container 108 to be isolated in order to prevent resource starvation caused by excessive resource utilization by one or more of the tenants 110. Additional details regarding these mechanisms for resource isolation are described below with regard to FIGS. 2A-3.

Threads Per Tenant

Figure 2A:
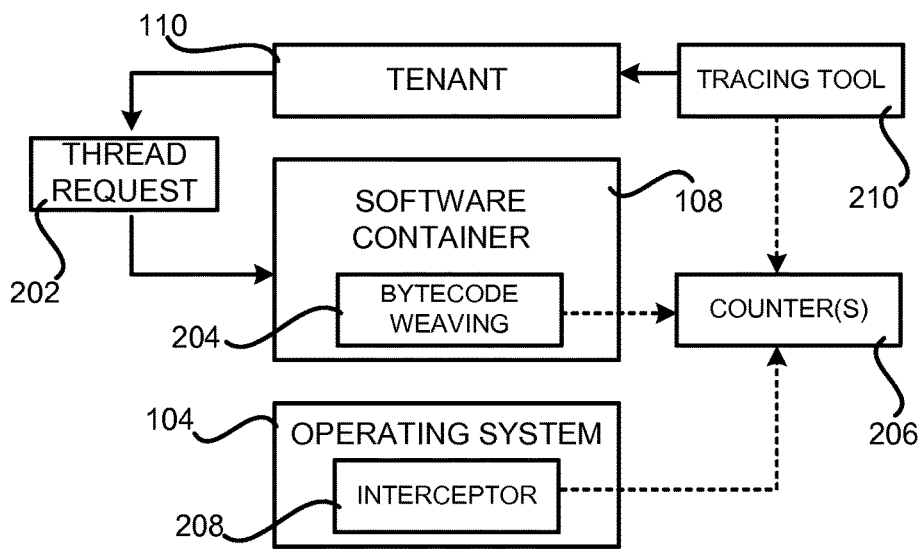
FIG. 2A is a software architecture diagram illustrating one mechanism disclosed herein for per tenant isolation of thread creation.

FIG. 2A is a software architecture diagram illustrating one mechanism disclosed herein for per tenant isolation of execution thread creation. Typically, a software container 108 will have some number of execution threads available for allocation to the tenants 110. The software container 108 allocates these threads to the tenants 110 when requests 202 are received that are directed to the tenants 110. The tenants 110 can also create new threads by submitting requests to the software container 108.

Each new thread that is created by a tenant 110 consumes CPU resources. Therefore, a tenant 110 that utilizes an excessive number of threads might cause other tenants 110 to be unable to obtain threads. In order to isolate the utilization of threads among the tenants 110, various mechanisms might be utilized in order to monitor the number of threads that each tenant 110 is creating and, potentially, to place a cap (which might be referred to herein as a "quota" or a "threshold"), on the number of threads that can be created per tenant 110. If a tenant 110 reaches the maximum number of threads that can be allocated to it, then no further threads may be allocated to that tenant 110. In this regard, it should be appreciated that the various caps described herein might be calculated in various ways. For example, and without limitation, caps might be computed dynamically based upon various conditions, such as the load on the host computer 102 at a given point in time. Other factors might also be utilized to dynamically determine a cap for the various resource types described herein.

In order to monitor the number of threads created by each tenant 110, bytecode weaving 204 may be utilized to instrument an application programming interface utilized by the tenants 110 ("APIs") for thread creation. In particular, when a tenant 110 requests to create a new thread, bytecode weaving may be utilized to increment a counter 206 that indicates the number of threads created by that tenant 110. As known in the art, bytecode weaving 204 permits the injection of program code at run time to perform certain tasks. Bytecode weaving 204 may be utilized in embodiments where the tenants 110 are expressed utilizing the JAVA programming language and wherein the virtual machine 106 is a JAVA virtual machine ("JVM"). Other similar mechanisms might also be utilized in conjunction with other programming languages in order to modify program code at run time in the manner described herein.

In other implementations, interception may be utilized to monitor the number of threads created by each of the tenants 110. In particular, when a tenant 110 creates a new thread, a notification may be provided to the operating system 104 indicating that the new thread has been created. In this way, the operating system 104 can be aware of the threads that are being created by the virtual machine 106. A process (referred to herein as an "interceptor 208") might be implemented at the level of the operating system 104 in order to monitor these notifications and increment a counter 206 associated with each tenant 110 as thread creation notifications are received. Interception might also be implemented at the level of the virtual machine 106 in other implementations.

Tracing might also be utilized to monitor the number of threads created by each of the tenants 110. For example, and without limitation, a tracing tool 210, such as PERF or PTRACE, might be utilized to monitor the number of threads created by each of the tenants 110. As known to those skilled in the art, these tools provide functionality for one process (i.e. a "tracer") to observe, and potentially control, the execution of another process (i.e. the tenants 110). In this embodiment, the tracer may be utilized to monitor thread creation and maintain a counter 206 for the tenants 110 indicating the number of threads that have been created.

In view of the above, it should be appreciated that bytecode weaving, interception, and/or tracing may be utilized to keep track of the number of threads created by the tenants 110 executing in the multi-tenant software container 108. It should be appreciated that these mechanisms are merely illustrative and that other mechanisms might also be utilized in other embodiments to monitor the number of threads created by tenants 110 in a multi-tenant software container 108.

If a tenant 110 requests to create threads in excess of a specified thread cap, an exception may be thrown and the tenant 110 may not be permitted to create the requested thread or any additional threads. In this way, each tenant 110 can be prevented from creating a disproportionate number of threads that may starve the other tenants 110 from being able to create threads. Other types of actions might also be taken with respect to a tenant 110 that attempts to create threads in excess of a specified thread cap. Additionally, the mechanisms described above might also be utilized to keep track of each thread that is created by the tenants 110. If a tenant 110 is removed from the software container 108, this information may be utilized to reap the threads previously created by that tenant 110. Tracking of threads created by each tenant 110 might be performed utilizing a thread group. Mechanisms might also be utilized to prevent tenants 110 from creating threads outside of a thread group.

Disk Space

Figure 2B:
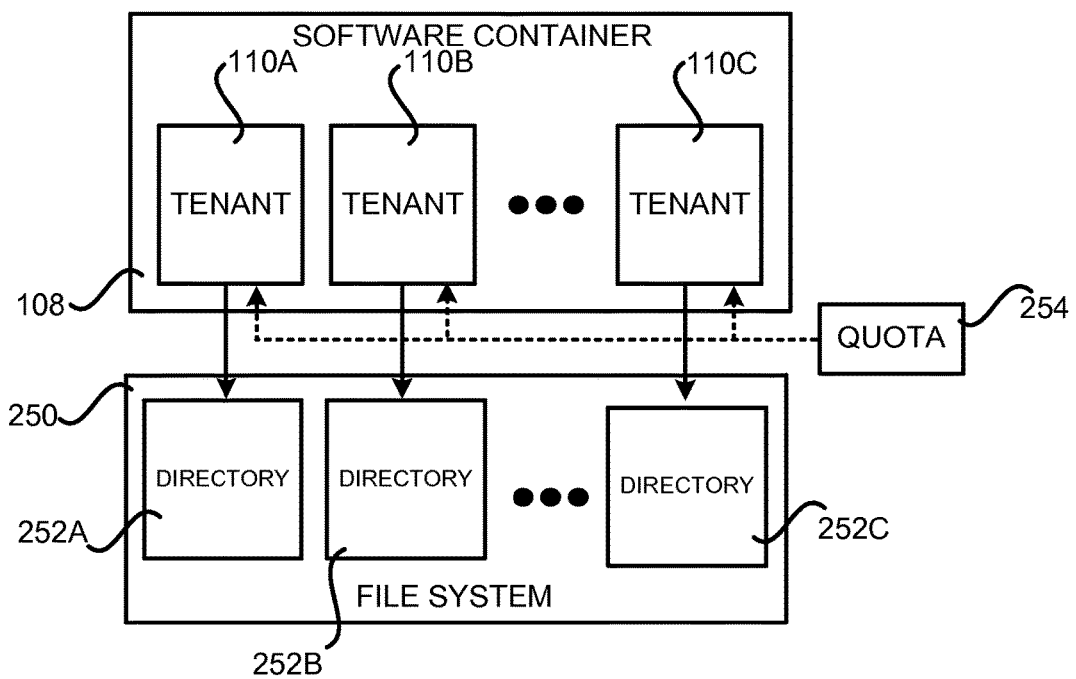
FIG. 2B is a software architecture diagram illustrating aspects of one mechanism disclosed herein for per tenant isolation of disk space utilization.

FIG. 2B is a software architecture diagram illustrating aspects of one mechanism disclosed herein for per tenant 110 isolation of disk space utilization. In order to isolate the use of disk space by the tenants 110 on the host computer 102, or in another location, each tenant 110 might be required to utilize only a particular directory 252 on a file system 250. For instance, in the example shown in FIG. 2B, the tenant 110A is permitted to write only to the directory 252A, the tenant 110B is permitted to write only to the directory 252B, and the tenant 110C is permitted to write only to the directory 252C on the file system 250.

In order to restrict each of the tenants 110 to a particular directory 252, bytecode weaving may be utilized in conjunction with calls made by the tenants 110 to write to the file system 250. Using this mechanism, an exception may be thrown if a write request is received from a particular tenant 110 for a directory 252 other than the directory 252 assigned to that tenant 110. In this way, write requests to a directory 252 not assigned to the tenant 110 may be restricted. Other mechanisms might also be utilized to prevent tenants 110 from writing data to a directory 252 other than their assigned directory 252.

A disk space quota 254 might also, or alternatively, be imposed on each tenant 110. Any data that the tenant 110 writes to their directory 252 on the file system 250 will count against the disk space quota 254 for that tenant 110. In order to implement this functionality, bytecode weaving may be utilized to instrument calls to write to the file system 250 made by the tenants 110 at the level of the virtual machine 106. For example, when a tenant 110 makes a call to the virtual machine 106 to write to the file system 250, the number of bytes to be written may be determined and a counter incremented for that tenant 110. Additionally, the quota 254 may be enforced by tracking and recording write calls at the operating system 104 level to determine which thread (i.e. tenant 110) is reading or writing to the file system 250. If a tenant 110 writes an amount greater than their quota 254 to the file system 250, the tenant 110 may not be permitted to make further writes. Other mechanisms might also be utilized in order to limit the amount of data written to a file system 250 by each of the tenants 110.

File Descriptors

Figure 2C:
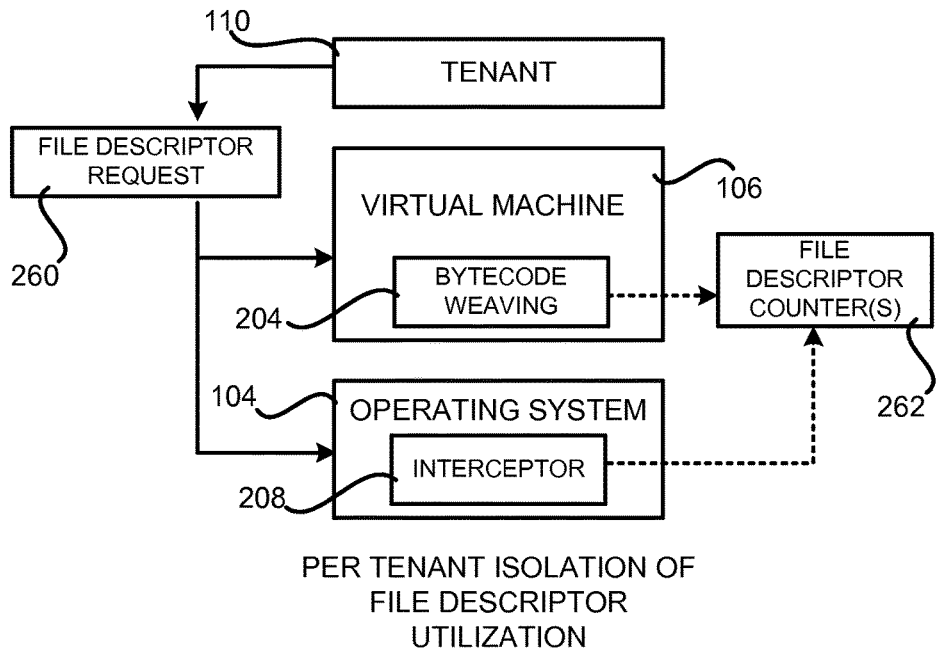
FIG. 2C is a software architecture diagram illustrating aspects of one mechanism disclosed herein for per tenant isolation of file descriptor utilization.

FIG. 2C is a software architecture diagram illustrating aspects of one mechanism disclosed herein for per tenant 110 isolation of file descriptor utilization. As known to those skilled in the art, a file descriptor is an abstract indicator for accessing a file. Because file descriptors utilize memory for storage, a tenant 110 that utilizes a significant number of file descriptors might consume a disproportionate amount of memory.

In order to prevent a tenant 110 from utilizing a disproportionate number of file descriptors, bytecode weaving 204 of file descriptor requests 260 at the virtual machine 106 level might be utilized to maintain a counter 262 indicating the number of file descriptors utilized by each of the tenants 110. Alternatively, an interceptor 208 may be utilized at the operating system 104 level to intercept calls to the operating system 104 to create file descriptors and maintain a count of the number of file descriptors created by each of the tenants 110. Once the counter 262 for a tenant 110 reaches a specified number of file descriptors (i.e. a cap), the tenant 110 may not be permitted to create additional file descriptors.

System Memory

Utilizing the mechanisms disclosed herein, tenants 110 in a multi-tenant software container 108 might also be prohibited from running separate processes outside of the virtual machine 106. For instance, and without limitation, bytecode weaving 204 at the virtual machine 106 level, interception at the operating system 104 level and/or other mechanisms might be utilized to instrument calls made by the tenants 110 to create processes outside the virtual machine 106 and to prevent such processes from being created. If the tenants 110 are permitted to create processes outside the virtual machine 106, bytecode weaving 204 and/or interception might be utilized to keep track of the amount of memory utilized by the processes that are created by each tenant 110 outside of the virtual machine 106. Additional details regarding various mechanisms disclosed herein for isolating the utilization of memory among tenants 110 executing in a multi-tenant software container 108 will be provided below.

Load Balancer Connections

A virtual Internet protocol address ("VIP"), which might be hosted on a load balancer for example, might also be considered a shared resource for which excessive utilization by one of the tenants 110 might starve out other tenants 110. In order to address this possibility, the software container 108 might be instrumented utilizing bytecode weaving 204 in order to emit metrics showing how much network traffic is being received by each of the tenants 110. These metrics might then be utilized to take various types of actions such as pausing execution or execution throttling, for instance, with respect to tenants 110 that are receiving an excessive amount of network traffic from the VIP. Other mechanisms might also be utilized in order to determine the amount of network traffic each tenant 110 is receiving and for taking action with regard to a tenant 110 receiving an excessive or undesirable amount of network traffic.

It should be appreciated that, in some embodiments, functionality might also be implemented within a software container 108 for intercepting network requests from tenants 110 executing within the software container 108 and routing the requests based on one or more factors. For example, and without limitation, a software container 108 might be configured to route tenant 110 requests based upon the geographic or physical proximity of the destination (e.g. a host computer or a data center). A software container 108 might also be configured to route tenant 110 requests based upon other types of factors. Byte code weaving 204 might also be utilized within a virtual machine 106 to route network traffic to a specific host computer rather than a load balancer. Other mechanisms for modifying network traffic and performing other types of optimizations within a software container 108 might also be implemented in other embodiments. Other such mechanisms are described in U.S. patent application Ser. No. 13/592,922, entitled "Optimized Deployment and Execution of Programs in a Distributed Computing Environment", which was filed on Aug. 23, 2012, the entirety of which is expressly incorporated herein by reference.

Permanent, Young, and Old Generation

Figure 2D:
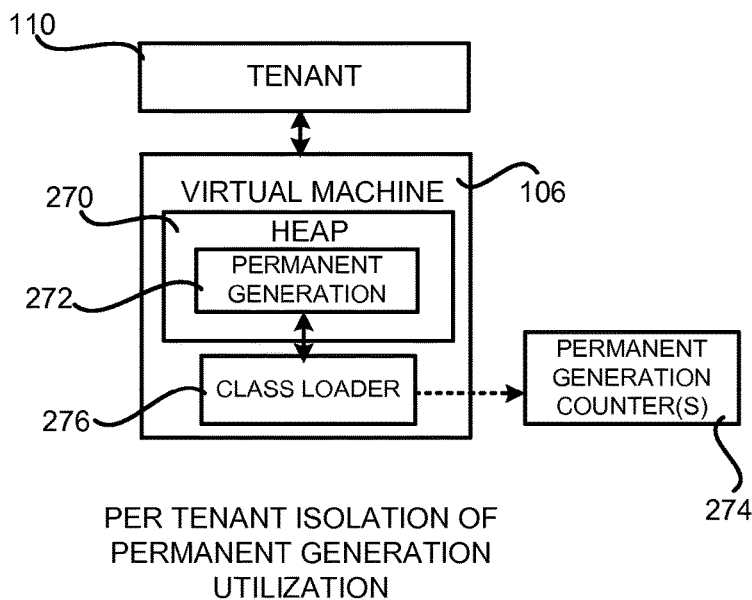
FIG. 2D is a software architecture diagram illustrating aspects of one mechanism disclosed herein for per tenant isolation of heap utilization.

FIG. 2D is a software architecture diagram illustrating aspects of one mechanism disclosed herein for per tenant 110 isolation of heap 270 utilization. Some virtual machines 106, such as JAVA virtual machines ("JVMs"), utilize a particular memory management model that manages stored data differently based upon the age of the data. In particular, some JVMs utilize a heap 270 that is divided into at least three different generations: a permanent generation 272, a young generation, and an old generation. Each of these generations is described below along with mechanisms for isolating the use of the various generations by the tenants 110 executing in the multi-tenant software container 108. It should be appreciated that the concepts described below may be utilized with other types of virtual machines 106 that utilize different mechanisms to manage and garbage collect stored data.

The permanent generation 272 is a pool containing all the reflective data of the virtual machine 106, such as class and method objects and related metadata. With JVMs that use class data sharing, the permanent generation 272 may be divided into read-only and read-write areas. The permanent generation 272 typically does not shrink, but only grows. When multiple tenants 110 are executing in a multi-tenant software container 108, the tenants 110 contend for the available permanent generation 272. Consequently, the utilization of a disproportionate amount of the permanent generation 272 by one tenant 110 might result in the inability of the virtual machine 106 to allocate the permanent generation 272 to other tenants 110. Running out of the permanent generation 272 might also cause execution of the virtual machine 106 to fail.

In order to address this problem, and potentially others, a classloader 276 may be configured to monitor the creation of objects by the tenants 110. For example, the classloader 276 might be configured to monitor the utilization of the permanent generation 272 by each of the tenants 110. Monitoring the utilization of the permanent generation 272 in this manner permits permanent generation counters 274 to be maintained indicating the amount of permanent generation 272 utilized by each of the tenants 110. If a tenant 110 exceeds their permanent generation 272 allowance, the virtual machine 106 may not allocate additional data to the permanent generation 272 for the tenant 110.

The virtual machine 106 utilizes the young generation to store short-lived objects that are immediately garbage collected. The virtual machine 106 might move objects that persist longer to the old generation. Garbage collection of the old generation by the virtual machine 106 might impose a performance penalty on tenants 110 executing within the multi-tenant software container 108. Consequently, disproportionate utilization of the old generation by one of the tenants 110 might impose a performance hit on the other tenants 110 executing in the multi-tenant software container 108.

In order to address this problem, and potentially others, bytecode weaving 204 might also be utilized to keep track of the amount of young generation and/or new generation utilized by each of the tenants 110. Bytecode weaving 204 might also be utilized to keep track of the new objects created by the tenants 110. The volume of new objects created by each of the tenants 110 might be utilized as an indicator of the amount of permanent generation, young generation and/or old generation utilized by each of the tenants 110. This mechanism might be utilized if it is not possible to bytecode weave the amount of permanent, young, or old generation utilized by each of the tenants 110.

Other mechanisms might also be utilized to determine the amount of each generation utilized by each of the tenants 110. For example, and without limitation, a dump of the heap 270 might be utilized to determine the amount of young generation and/or old generation utilized by each of the tenants 110. A heap 270 dump might be performed periodically (e.g. every few minutes) in order to maintain a current count of the young generation and old generation utilized by each of the tenants 110. The dump may be utilized to determine whether one of the tenants 110 is utilizing an excessive amount of the young and/or old generation. Various types of actions may then be taken with regard to a tenant 110 that is utilizing too much of the young or old generation.

"Shadow" environments might also be utilized in some embodiments to determine if one of the tenants 110 is utilizing a disproportionate amount of permanent, young, or old generation. In this embodiment, individual tenants 110 may be configured in shadow environments 280 where they execute independently (i.e. one tenant 110 per software container 108). Requests received for the tenants 110 may be routed to the shadow environments 280. The virtual machines 106 executing in the shadow environments 280 may then be utilized to determine the utilization of permanent, young, and old generation by each of the tenants 110 individually. A specific example of this embodiment is shown in FIG. 2E.

Figure 2E:
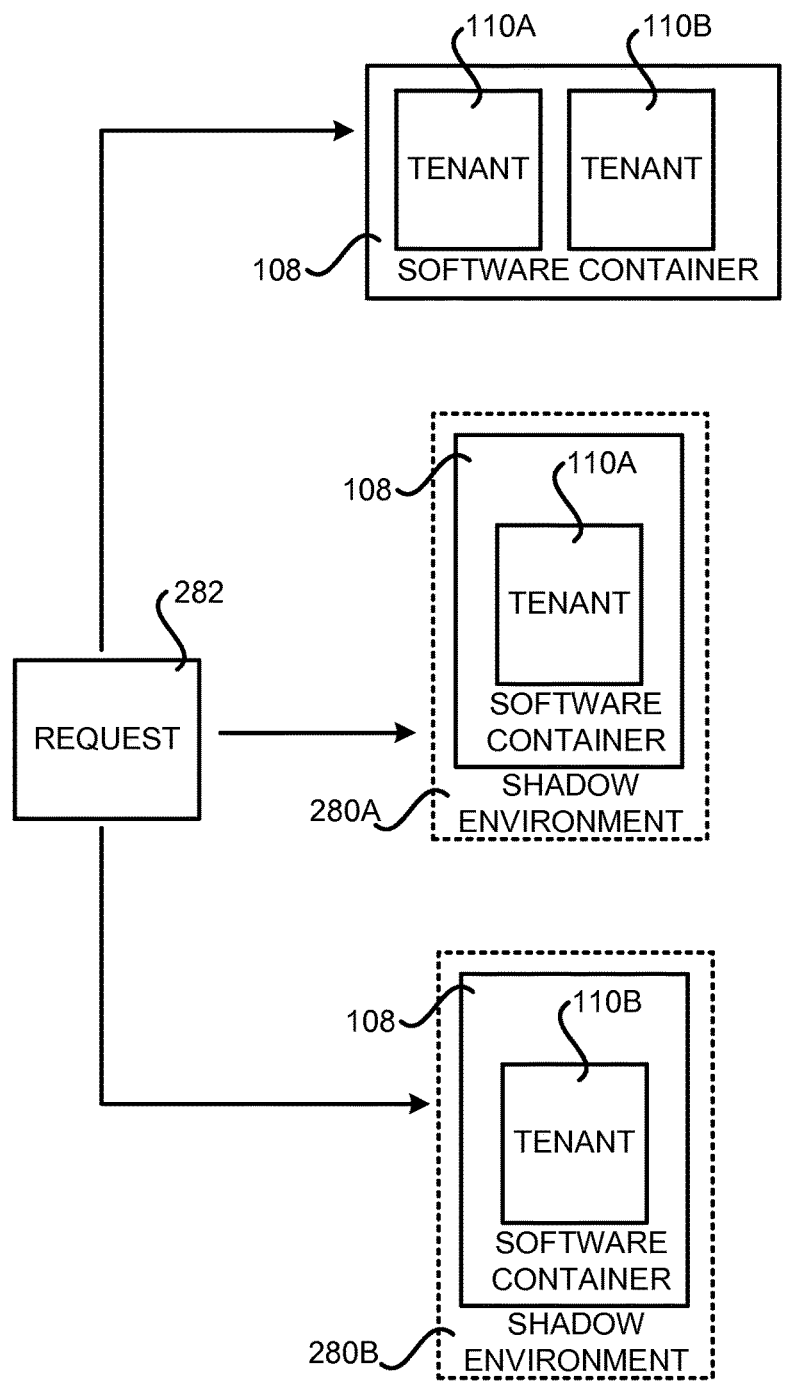
FIG. 2E is a software architecture diagram illustrating aspects of one mechanism disclosed herein for determining per tenant resource usage utilizing shadow environments.

As shown in FIG. 2E, two tenants 110A and 110B may be executed in a multi-tenant software container 108 that has very high utilization of permanent generation, young generation, and/or old generation. In this example, it may be difficult to determine which of the tenants 110A and 110B, or both, are responsible for the high resource utilization. In order to identify the tenant 110A or 110B that is responsible for the high resource utilization, a shadow environment 280A might be created for executing only the tenant 110A. A separate shadow environment 280B might also be created for executing only the tenant 110B. Incoming requests 282 can be routed to the software container 108 for processing in a typical fashion. Incoming requests 282 can also be routed to the shadow environments 280A and 280B for processing by the tenants 110A and 110B executing in those shadow environments 280A and 280B. The utilization of resources in each of the shadow environments 280A and 280B can then be monitored to determine whether the tenant 110A or 110B (or both) is responsible for the high resource utilization in the multi-tenant software container 108. It should be appreciated that shadow environments 280 might also be utilized to isolate the utilization of other types of resources by the tenants 110.

In some embodiments, bytecode weaving 204 is utilized in conjunction with a finalizer in order to determine the number of objects that were garbage collected. As known in the art, JVMs may utilize a finalizer following garbage collection. By bytecode weaving the finalizer, a counter that describes the amount of memory utilized by each of the tenants 110 might be reduced by the amount of objects that were garbage collected for each of the tenants 110. Other mechanisms might also be utilized in conjunction with JVMs and other types of virtual machines 106 in order to maintain an accurate count of the memory utilized by the tenants 110 by reducing the count of the amount of memory utilized by each tenant 110 following garbage collection.

Disk I/O Operations and Bandwidth

In a similar manner to that described above with regard to FIG. 2B, bytecode weaving 204 at the virtual machine 106 level and/or interception at the operating system 104 level might also be utilized to determine the total number of disk reads and disk writes per second (or other time period) for each of the tenants 110. In a similar manner, and as also described above, tracing tools and shadow environments 280 might also be utilized to determine the number of disk I/O operations performed by each of the tenants 110 executing in the multi-tenant software container 108. Various actions might then be taken with regard to tenants 110 that utilize an excessive amount of disk I/O. For example, and without limitation, execution of the tenant 110 might be throttled, paused, or terminated. Other types of actions might also be taken to reduce the amount of disk I/O per time period utilized by a particular tenant 110.

Network I/O Operations and Bandwidth

In a similar manner to that described above with regard to FIG. 2B, bytecode weaving at the virtual machine 106 level and/or interception at the operating system 104 level might also be utilized to determine the total number if network reads and writes per second (or other time period) for each of the tenants 110. In a similar manner, and as also described above, tracing tools 210 and shadow environments 280 might also be utilized to determine the number of network I/O operations performed by each of the tenants 110 executing in the multi-tenant software container 108. Various actions might then be taken with regard to tenants 110 that utilize an excessive amount of network I/O. For example, and without limitation, execution of the tenant 110 might be throttled, paused, or terminated. Other types of actions might also be taken to reduce the amount of network I/O per time period utilized by a particular tenant 110.

Figure 3:
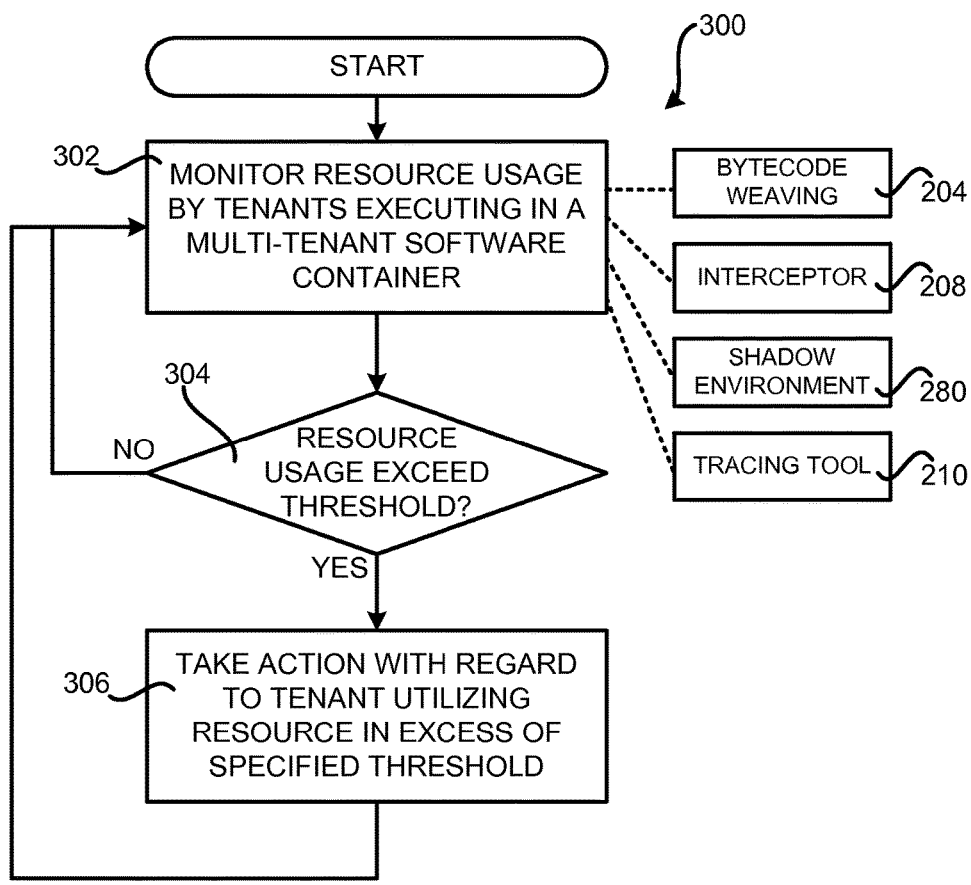
FIG. 3 is a flow diagram showing a routine that illustrates aspects of one illustrative method disclosed herein for resource isolation between tenants executing in a multi-tenant software container.

FIG. 3 is a flow diagram showing a routine 300 that illustrates aspects of the mechanism shown in FIGS. 2A-2E and described above for providing resource isolation between tenants 110 executing in a multi-tenant software container 108, according to one embodiment disclosed herein. It should be appreciated that the logical operations described herein with respect to FIG. 3, and the other Figures, may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the Figures and described herein. These operations may also be performed in parallel, or in a different order than those described herein. Some or all of these operations might also be performed by components other than those specifically identified.

The routine 300 begins at operation 302, where resource usage by tenants 110 in a multi-tenant software container 108 is monitored. As discussed above, the various types of resources for which usage might be monitored includes, but is not limited to, disk space, CPU utilization, system memory, heap and garbage collection occurrences, disk I/O operations and bandwidth, network I/O operations and bandwidth, load balancer connections, file descriptor count, and execution threads. It should be appreciated that this list of resources is merely illustrative and that the utilization of other types of resources by tenants 110 in a multi-tenant software container 108 might also be monitored.

As also discussed above, various mechanisms might also be utilized to monitor the utilization of the resources described above by the tenants 110. For example, and without limitation, bytecode weaving 204 might be utilized at various levels of the stack shown in FIG. 1 in order to monitor resource utilization by the tenants 110. An interceptor 208 might also be utilized at the level of the operating system 104 or another level of the stack. As also discussed above, one or more shadow environments 280 might also be utilized to isolate the execution of a particular tenant 110 and to determine its resource utilization. Tracing tools 210, memory dumps, and other mechanisms might also be utilized to determine the resource utilization of the tenants 110 in other implementations.

From operation 302, the routine 300 proceeds to operation 304, where a determination is made as to whether one of the tenants 110 has utilized a specific resource in excess of a specified threshold, or cap. For example, a determination might be made as to whether one of the tenants 110 has utilized permanent generation in excess of a specified cap. As another example, a determination might be made as to whether a tenant 110 has utilized file descriptors or disk space in excess of a specified quota. If a tenant has not utilized a resource in excess of a specified threshold, the routine 300 proceeds back to operation 302, where resource usage monitoring might continue in the manner described above. If, however, a tenant 110 has utilized a resource in excess of a specified cap, threshold, or quota, the routine 300 proceeds from operation 304 to operation 306.

At operation 306, one or more actions might be taken with regard to a tenant 110 that utilizes resources in excess of a specified threshold. For example, and without limitation, a resource request might be denied, a resource request might be redirected to another location, a tenant 110 might be evicted from the software container 108, a tenant 110 might be moved to another software container 108 on another host computer, a tenant 110 might be allocated fewer CPU cycles, and/or the execution of a tenant 110 might be paused and/or throttled. Other actions might also be taken with regard to a tenant 110 that utilizes resources in excess of a specified threshold. From operation 306, the routine 300 proceeds back to operation 302, where processing may continue in the manner described above.

It should be appreciated that the results of the various types of resource monitoring described above for enforcing resource isolation among tenants 110 might also be utilized for other purposes in certain implementations. For example, and without limitation, results of the resource monitoring described above might be provided to a billing system (not shown) and utilized to charge a customer for the actual use of computing resources on a per tenant 110 basis. As a specific example, a customer might be billed for the use of disk space, memory, CPU utilization and/or other resources in an amount that is based upon monitoring the use of these resources by an associated tenant 110 using one or more of the various mechanisms described above. The results of the monitoring described above might also be utilized for other purposes not specifically mentioned herein.

Dependency Isolation

Figure 4A:
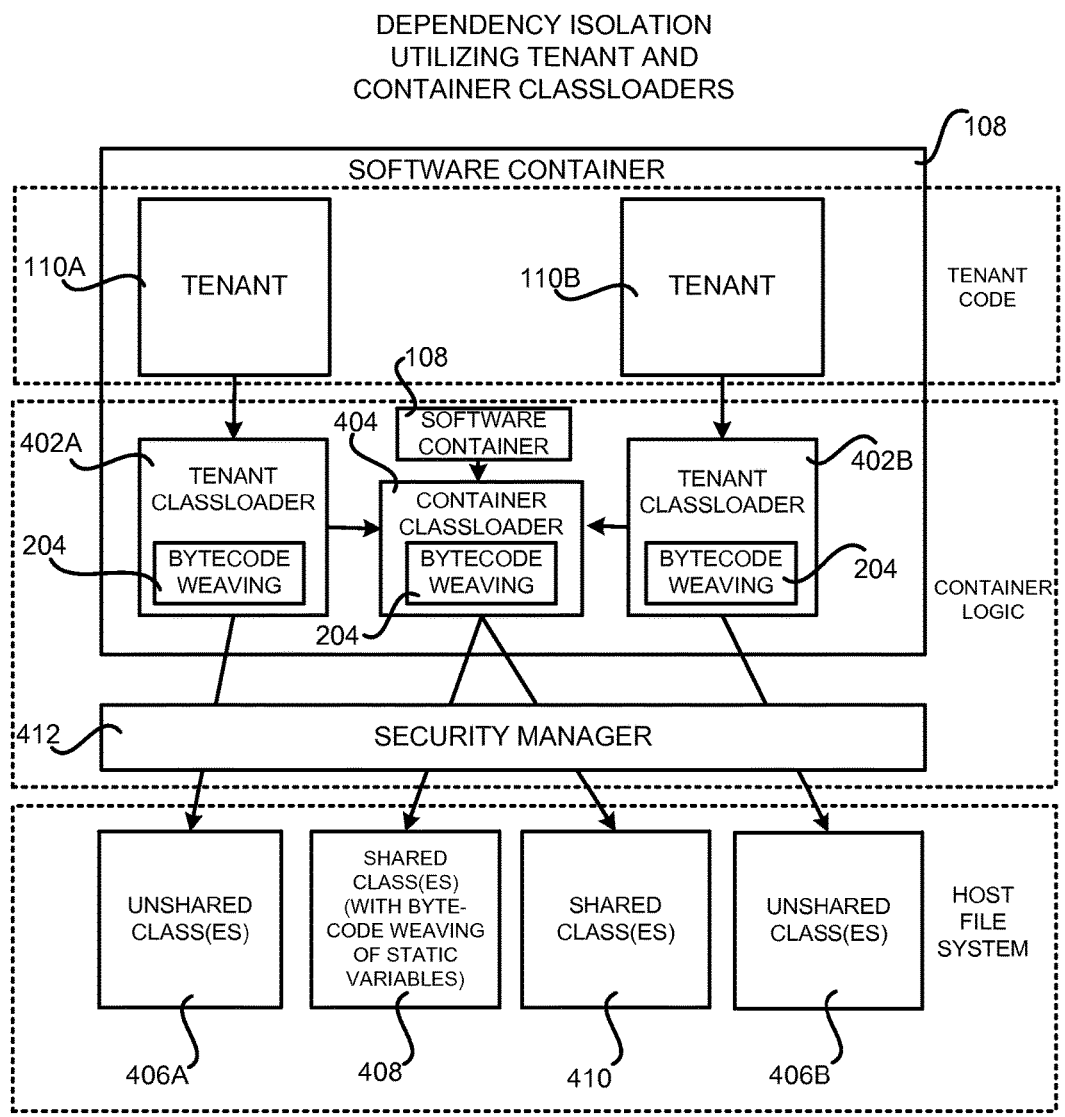
FIG. 4A is a software architecture diagram illustrating aspects of one mechanism for dependency isolation of tenants in a multi-tenant software container utilizing tenant and container classloaders.

As discussed briefly above, mechanisms are also disclosed herein for dependency isolation that may be utilized to prevent one tenant 110A executing in a multi-tenant software container 108 from utilizing another tenant 110B in the same container 108 in a manner that requires co-tenancy (i.e. in a manner that requires that both tenants 110A and 110B co-exist in the same container 108). One such mechanism is shown in FIG. 4A, which is a software architecture diagram illustrating aspects of one mechanism for dependency isolation of tenants 110 in a multi-tenant software container 108 utilizing tenant classloaders 402A and 402B and a container classloader 404.

The mechanism shown in FIG. 4A and described in detail below is configured to ensure that tenants 110A and 110B executing in the same multi-tenant software container 108 do not communicate with one another directly through classes exposed by one another (i.e. one tenant 110A calling a particular method on a class exposed by another tenant 110B directly, or sharing a class in memory). Rather, utilizing the mechanism shown in FIG. 4A, the tenants 110A and 110B can be required to communicate with one another, or with the container 108, through classes that are available through a container classloader 404 or through mechanisms provided outside of the container (e.g. a properly formatted HTTP request that passes through a common layer of the stack like the operating system).

In order to address the considerations set forth above, and potentially others, each of the tenants 110 in a multi-tenant software container 108 is associated with a tenant classloader 402. For instance, in the example shown in FIG. 4A, the tenant 110A is associated with the tenant classloader 402A. Similarly, the tenant 110B is associated with the tenant classloader 402B. If a multi-tenant software container 108 includes additional tenants 110, those tenants 110 would also be associated with respective tenant classloaders 402.

The tenant classloaders 402 are responsible for loading classes on behalf of their associated tenants 110 that are not shared with other tenants (i.e. unshared classes). In the example shown in FIG. 4A, for instance, the tenant 110A utilizes the tenant classloader 402A to load the unshared classes 406A. Similarly, the tenant 110B utilizes the tenant classloader 402B to load the unshared classes 406B.

When a tenant 110 requests a class from a tenant classloader 402, the tenant classloader 402 determines if the requested class is a shared class 410. For example, and without limitation, the tenant classloader 402 might examine a package, or bundle, that contains the requested class to determine if the class is a shared class 410. If the requested class is an unshared class 406, the tenant classloader 402 will load the requested class. If, however, the tenant classloader 402 determines that the requested class is a shared class 410, the tenant classloader 402 delegates the responsibility for loading the requested class to the container classloader 404.

The container classloader 404 is responsible for loading shared classes 410. Through functionality provided by the container classloader 404, two tenants 110A and 110B can utilize the same class definition. Both tenants 110A and 110B cannot, however, use the same class definition to interpret one object in memory. So, the container classloader 404 can load the class definition, and both tenants 110A and 110B can utilize the class definition to create instances of the class. However, the instances created by each tenant 110A and 110B will be located in separate pools. In this way, a common shared class 410 can be loaded into memory only once, and instances for use by different tenants 110A and 110B may be created and utilized independently (e.g. the tenant 110A cannot access an object of the same class loaded by tenant 110B, and vice versa).

The shared classes 410 loaded by the container classloader 404 might be classes for enabling tenant-to-tenant communication. The shared classes 410 loaded by the container classloader 404 might also be classes for enabling tenant-to-container communication. Other types of shared classes 410 might also be loaded by the container classloader 404 and managed in the manner described herein.

As shown in FIG. 4A, the container classloader 404 might also load shared classes 408 that utilize bytecode weaving of static variables. Through the use of bytecode weaving of static variables, classes not originally intended for execution in a multi-tenant software container 108 might be modified for proper execution within the multi-tenant software container 108. One mechanism for bytecode weaving of static variables in this manner is described in U.S. patent application Ser. No. 13/800,783, entitled "MODIFICATION OF PROGRAM CODE FOR EXECUTION IN A MULTI-TENANT OR DISTRIBUTED COMPUTING ENVIRONMENT", filed on Mar. 13, 2013, and which is expressly incorporated herein by reference in its entirety.

As also shown in FIG. 4A, the tenant classloaders 402 and the container classloader 404 might also perform bytecode weaving 204. In particular, the tenant classloaders 402 and the container classloader 404 might utilize bytecode weaving 204 in order to modify unshared classes 406 at load time to perform certain functionality. For example, and without limitation, bytecode weaving 204 might be utilized to implement various mechanisms described above for resource isolation and/or various mechanisms described below for fault isolation. For instance, and without limitation, a tenant classloader 402 might perform bytecode weaving 204 to instrument unshared classes 406 that load objects, allocate memory or use disk space, in order to maintain a counter indicating the amount of a particular resource that has been utilized. Similarly, a tenant classloader 402 might utilize bytecode weaving 204 to throw an exception whenever a loaded unshared class 406 makes a call to shutdown the software container 108, a virtual machine, an operating system, and/or the host computer. The tenant classloaders 402 and/or the container classloader 404 might also implement bytecode weaving 204 in order to implement other aspects of the various mechanisms disclosed herein for resource isolation, security isolation, dependency isolation, and/or fault isolation.

As shown in FIG. 4A, a security manager 412 might also be utilized in conjunction with the mechanism described above for enforcing dependency between the tenants 110 through the utilization of tenant classloaders 402 and a container classloader 404. The security manager 412 might also be configured to provide additional functionality in this regard. For example, and without limitation, the security manager 412 might be configured to prevent one tenant 110 from loading unshared classes 406 associated with another tenant 110. The security manager 412 might also implement other types of functionality for enforcing dependency between the tenants 110. Additional details regarding the mechanism shown in FIG. 4A will be provided below with regard to FIGS. 5A and 5B.

It should be appreciated that the container classloader 404 may be considered another tenant 110 of the multi-tenant software container 108. For example, and without limitation, the container classloader 404 can be swapped out of the multi-tenant software container 108 like any other tenant 110. In order to achieve this, a second classloader may be created in the multi-tenant software container 108 with a slightly modified class path. Newly created tenants 110 will use the second classloader. Older tenants 110 executing in the multi-tenant software container 108 can be migrated to the second classloader. In this way, the application executing in the multi-tenant software container 108 can be redeployed without having to take down the virtual machine 106.

Figure 4B:
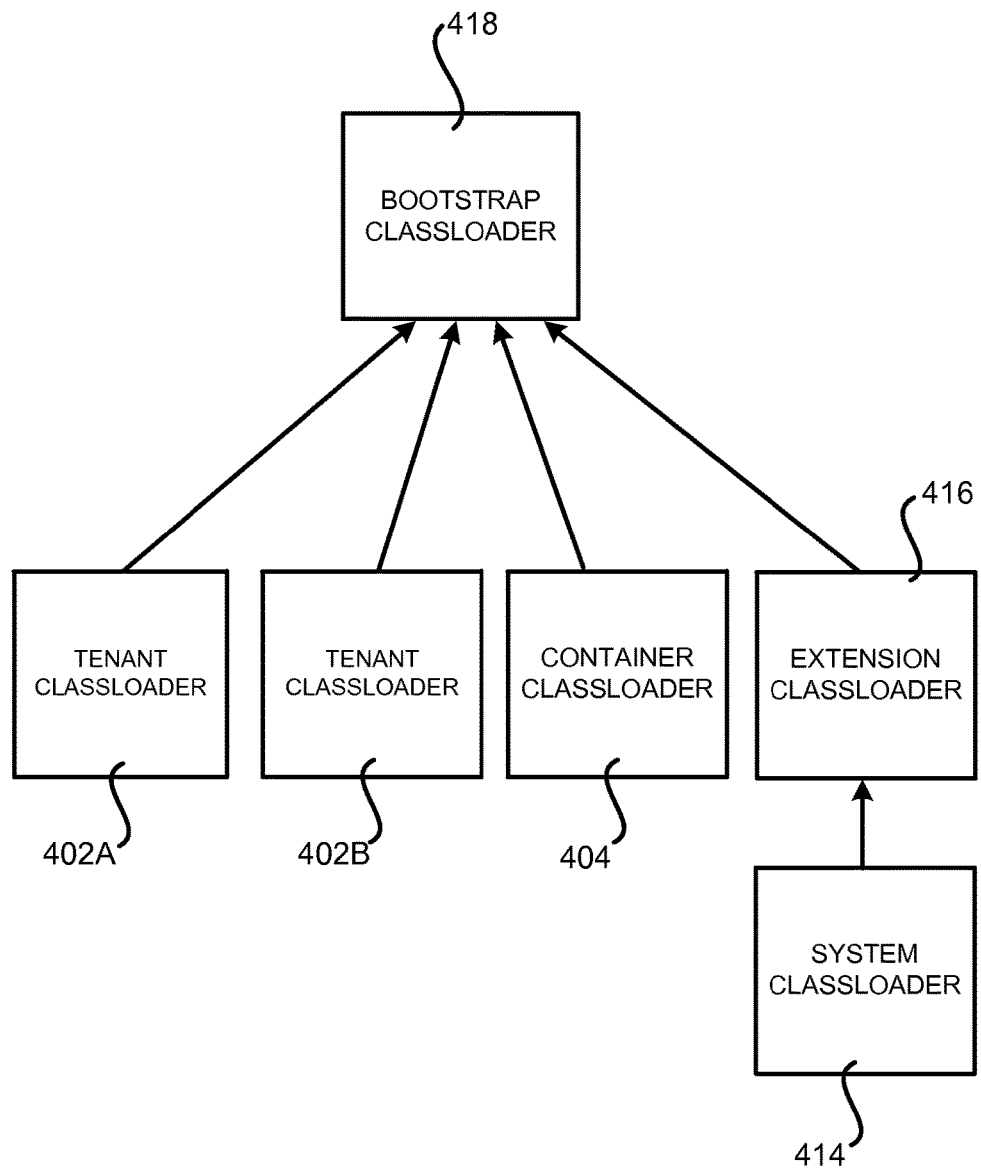
FIG. 4B is a software architecture diagram illustrating aspects of one mechanism for enforcing dependency isolation of tenants in a multi-tenant software container by modifying the parent classloaders of tenant and container classloaders.

Turning now to FIG. 4B, one mechanism for enforcing dependency isolation of tenants in a multi-tenant software container by modifying the parent classloaders of tenant and container classloaders will be described. When a classloader is created, its parent is, by default, the system classloader 414 on a JAVA platform. Having the system classloader 414 as a default allows tenants 110 to share classes without delegating to the container classloader 404 first. The parent classloader of the system classloader 414 is the extension classloader 416. The parent classloader of the extension classloader 416 is the bootstrap classloader 418.

In order to achieve better isolation between tenants 110, the bootstrap classloader 418 may be designated as the parent classloader for the tenant classloaders 402A and 402B. The bootstrap classloader 418 might also be designated as the parent classloader for the container classloader 404. In this way, tenants 110 may be prevented from loading classes through the system classloader 414 and/or the extension classloader 416. In another embodiment, a similar result may be achieved by configuring the tenant classloaders 402A and 402B and the container classloader 404 such that they do not have a parent classloader.

Figure 5A:
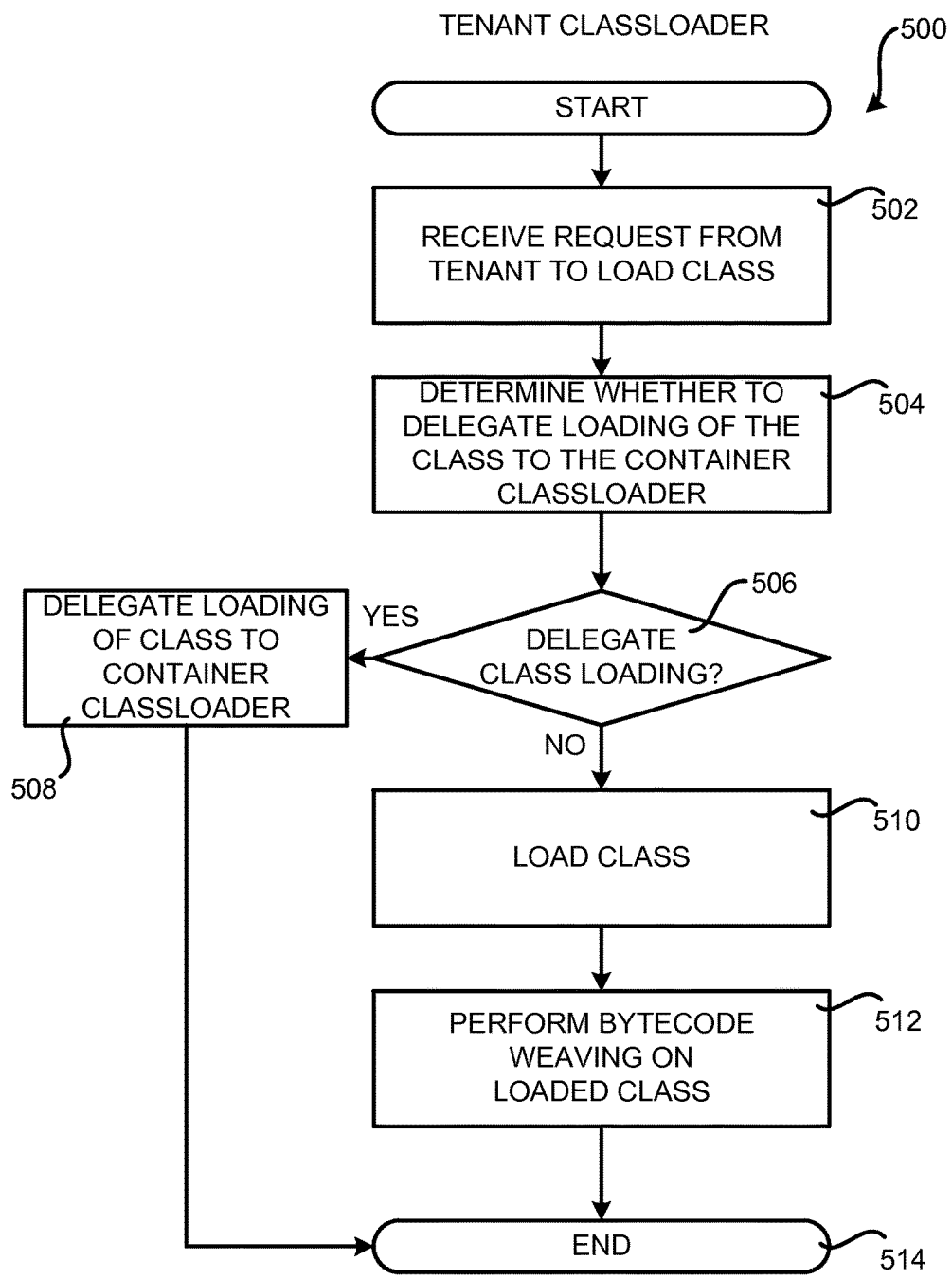
FIGS. 5A and 5B are flow diagrams showing routines that illustrate aspects of a mechanism disclosed herein for dependency isolation of tenants in a multi-tenant software container utilizing tenant and container classloaders.

Turning now to FIG. 5A, a flow diagram showing an illustrative routine 500 will be described that illustrates aspects of the operation of a tenant classloader 402. The routine 500 begins at operation 502, where a tenant classloader 402 receives a request from an associated tenant 110 to load a class. In response to such a request, the routine 500 proceeds from operation 502 to operation 504, where the tenant classloader 402 determines whether loading of the class requested by the tenant 110 should be delegated to the container classloader 404. For example, and as discussed above, the tenant classloader 402 might examine a package containing the requested class to determine if the requested class is a shared class 410 that should be loaded by the container classloader 404. Other mechanisms might also be utilized to determine if the requested class is an unshared class 406 that can be loaded by the tenant classloader 402 or whether the requested class is a shared class 410 that should be loaded by the container classloader 404.

If loading of the requested class is to be delegated to the container classloader 404, the routine 400 proceeds from operation 506 to operation 508. At operation 508, the tenant classloader 402 delegates loading of the requested class to the container classloader 404. Additional details regarding operation of the container classloader 404 will be provided below with reference to FIG. 5B. From operation 508, the routine 500 proceeds to operation 510, where it ends.

If, at operation 506, the tenant classloader 402 determines that loading of the requested class is not to be delegated to the container classloader 404, the routine 500 proceeds from operation 506 to operation 510, where the tenant classloader 402 loads the requested unshared class 406. The routine 500 then proceeds from operation 510 to operation 512, where the tenant classloader 402 might perform bytecode weaving 204 on the loaded unshared class 406 in order to implement various types of functionality, such as that described above for instrumenting the unshared class 406 to determine resource utilization and/or for intercepting a shutdown request or other type of operation implemented by the unshared class 406. Bytecode weaving 204 might also be utilized by the tenant classloader 402 to modify the loaded unshared class 406 in other ways. From operation 512, the routine 500 proceeds to operation 514, where it ends.

Figure 5B:
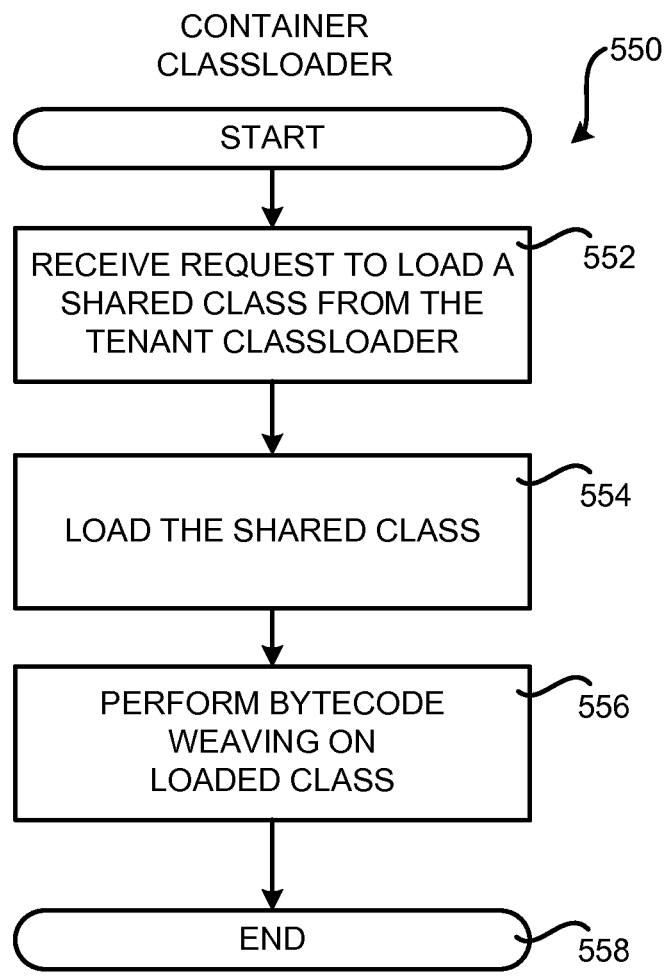

Turning now to FIG. 5B, a flow diagram showing an illustrative routine 550 will be described that illustrates aspects of the operation of the container classloader 404. The routine 550 begins at operation 552, where the container classloader 404 receives a request from a tenant classloader 402 to load a shared class 410. As discussed above, the responsibility for loading the shared class 410 might be delegated from the tenant classloader 402 to the container classloader 404. In response to receiving such a request, the container classloader 404 loads the shared class 410 as requested by the tenant classloader 402 (i.e. the class requested by the tenant 110) at operation 554.

From operation 554, the routine 550 proceeds to operation 556, where the container classloader 404 may perform bytecode weaving 204 on the loaded shared class 410 in order to implement various types of functionality, such as that described above for bytecode weaving 204 of shared classes 410 in order to enable program code not specifically programmed for execution within the multi-tenant software container 108 to execute properly within the multi-tenant environment. Bytecode weaving 204 might also be utilized by the container classloader 404 to modify the loaded shared classes 408 and 410 in other ways. From operation 556, the routine 500 proceeds to operation 558, where it ends.

Security Isolation

Figure 6A:
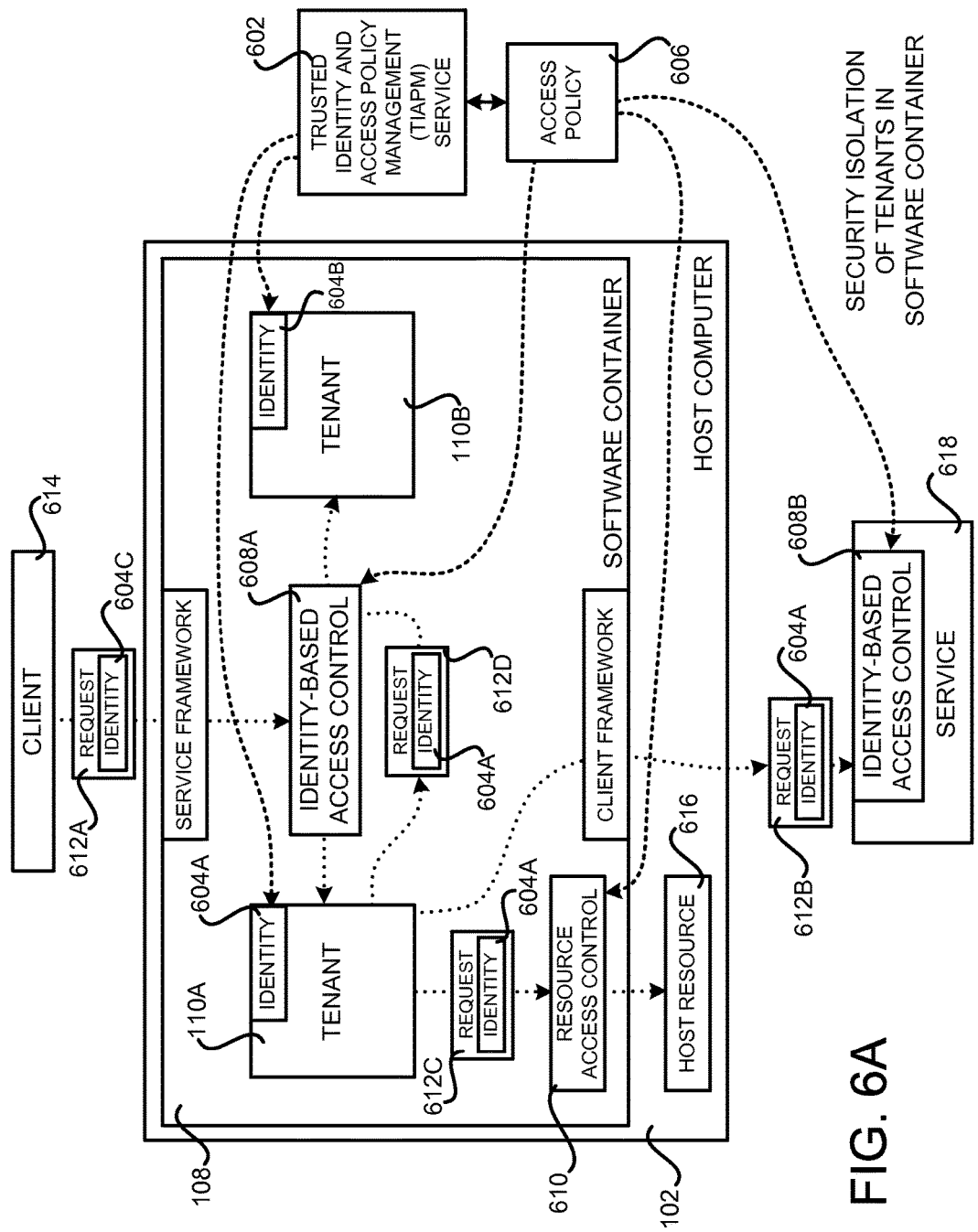
FIGS. 6A and 6B are software architecture diagrams illustrating aspects of several mechanisms disclosed herein for security isolation of the tenants of a multi-tenant software container.
Figure 6B:
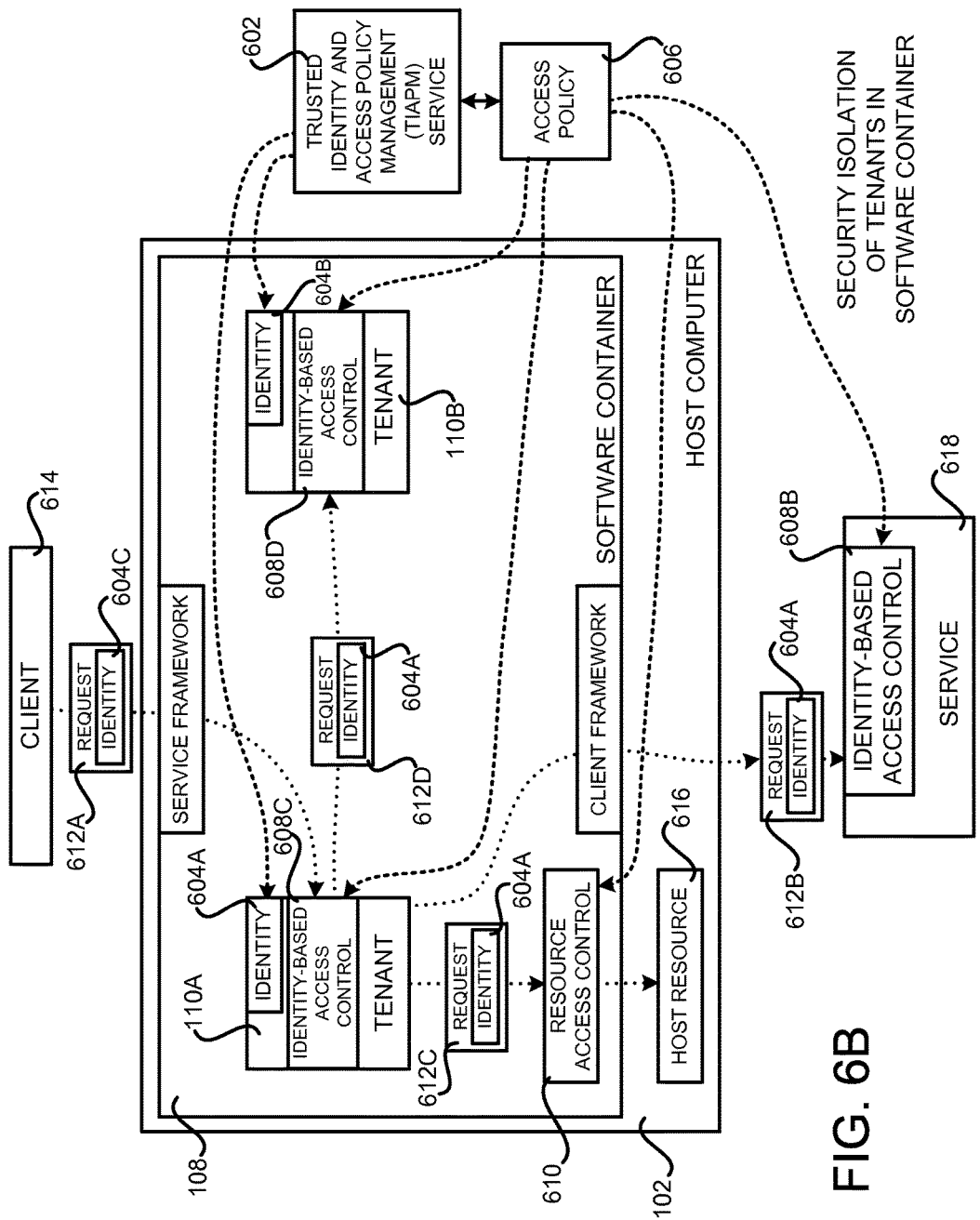
Figure 7:
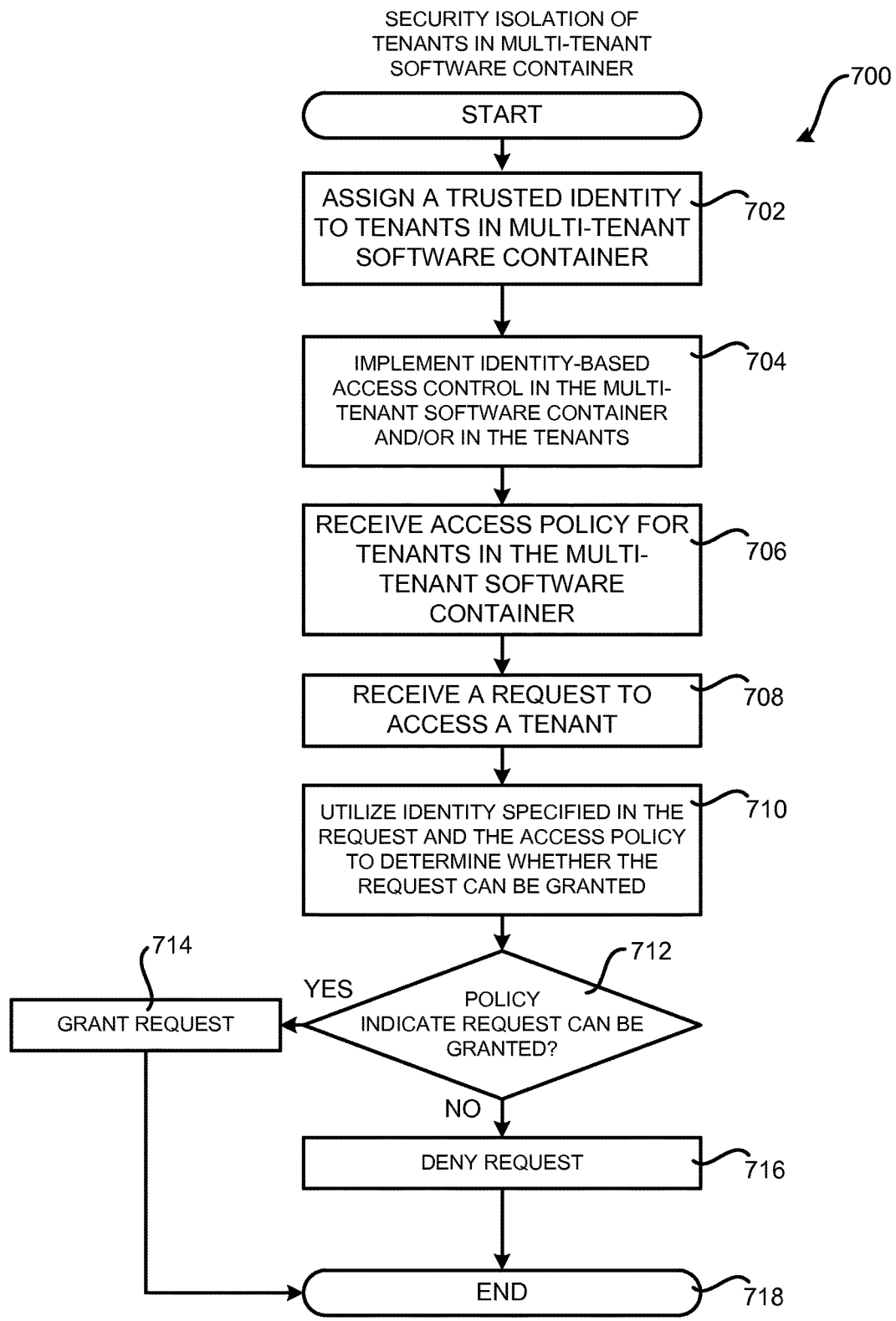
FIG. 7 is a flow diagram showing aspects of one illustrative routine disclosed herein for security isolation of the tenants of a multi-tenant software container.

As mentioned briefly above, the embodiments disclosed herein also provide mechanisms for security isolation of tenants 110 executing in a multi-tenant software container 108. Security isolation refers to a process of isolating tenants 110 executing in a software container 108 such that one tenant 110A cannot access another tenant 110B (i.e. the tenant's methods or data) without authorization. FIGS. 6A, 6B and 7 illustrate various mechanisms disclosed herein for security isolation of tenants 110 in a multi-tenant software container 108.

FIG. 6A is a software architecture diagram illustrating aspects of several mechanisms disclosed herein for security isolation of the tenants 110 of a multi-tenant software container 108. As shown in FIG. 6A and discussed briefly above, a TIAPM service 602 external to the multi-tenant software container 108 is utilized in one embodiment to assign a trusted identity 604 to each of the tenants 110 in a software container 108 for which security isolation is desirable. For instance, in the example shown in FIG. 6A, the TIAPM service 602 has assigned a trusted identity 604A to the tenant 110A and has assigned a trusted identity 604B to the tenant 110B. The TIAPM service 602 might also assign trusted identities to other entities and components. For instance, in the example shown in FIG. 6B, the TIAPM service 602 has also assigned the trusted identity 604C to the client 614. As will be described in greater detail below, the assigned trusted identities 604 may be utilized in conjunction with a relevant access policy to control access to the tenants 110, other services and resources.

As also shown in FIG. 6A, the TIAPM service 602 might also maintain an access policy 606, or policies, that defines the components that are authorized to access the tenants 110, other services external to the software container, such as the service 618, and, potentially, host resources 616 of the host computer 102 (e.g. operating system resources) that the multi-tenant software container 108 is executing upon. The TIAPM service 602 might also maintain access policies for other systems and components. It should be appreciated that while a single access policy 606 is illustrated in FIG. 6A, the TIAPM service 602 might maintain a separate access policy 606 for each component for which resource access control is desirable.

The TIAPM service 602 might also provide the access policies 606 to various components that are configured to enforce the policies. For example, in one embodiment, a framework (not shown in FIG. 1) within the software container 108 is configured to enforce identity-based access control 608A for accessing the tenants 110 of the multi-tenant software container 108. In another embodiment, described below in detail with regard to FIG. 6B, the tenants 110 themselves may be configured with functionality for identity-based access control, thereby permitting the tenants 110 to enforce their own access policies 606.

The TIAPM service 602 might also provide an access policy 606, or policies, to other systems, components, and/or services external to the software container 108 that may be called by the tenants 110 of the multi-tenant software container 108. For instance, in the example shown in FIG. 6A, the TIAPM service 602 provides an access policy 606 to the service 618 for use by the identity-based access control 608B in enforcing access restrictions to the service 618. Additionally, the TIAPM service 602 might provide an access policy 606 to be provided to a component, such as a security manager 412 (not shown in FIG. 6A), tasked with imposing resource access control 610 for host resources 616. Additional details regarding this process will be provided below.

It should be appreciated that the TIAPM service 602 might also provide other types of functionality. For example, and without limitation, the TIAPM service 602 might vend encryption keys and/or other types of data that permits clients to verify to called services that they are who they claim to be. For example, and without limitation, an entity that has been assigned a trusted identity 604 might also be assigned a public/private encryption key pair that the entity may utilize to sign and verify requests made by that entity. The TIAPM service 602 might also vend other types of data (e.g. certificates) to the various entities described herein for use in determining their identity in a trusted fashion and/or perform other types of functionality not specifically described herein.

It should also be appreciated that the various components described herein might cache the access policy 606 for use in evaluating access requests. The access policy 606 might be periodically refreshed by pulling an updated version of the access policy 606 from the TIAPM service 602. The TIAPM service 602 might also periodically push an updated access policy 606 to the various components tasked with enforcing the access policy 606. Other mechanisms might also be utilized to ensure that an updated version of the access policy 606 is made available to the various consumers of the access policy 606.

When a tenant 110A generates a request 612D to access another tenant 110B in the multi-tenant software container 108, or in another container, the tenant 110A includes their associated trusted identity 604A with the request. 612D. The supplied trusted identity 604A can then be utilized, along with the relevant access policy 606 (i.e. the access policy 606 for the requested tenant 110B), to determine if the request 612D can be granted. For example, if the request 612D is to a second tenant 110B in the same multi-tenant application container 108, a framework (not shown in FIG. 6A) in the container 108 or the second tenant 110B itself may utilize the trusted identity 604A of the requesting tenant 110A and an access policy 606 associated with the second tenant 110B to determine if the request 612D should be granted.

A tenant 110A might also make a request 612B to access a service 618 outside the multi-tenant container 108 that includes the trusted identity 604A associated with the tenant 110A. The service 618 will utilize the trusted identity 604A supplied with the request 612B and an appropriate access policy 606 (i.e. the access policy 606 for accessing the service 618) to determine whether the request 612B can be granted.

Incoming requests 612 directed to tenants 110 of the multi-tenant software container 108, such as the request 612A, might also include a trusted identity 604C associated with the calling client 614. In this case, the trusted identity 604C of the calling client 614 and an access policy 606 associated with the called tenant 110 can be utilized to determine whether the incoming request 612A should be permitted or denied. In the example shown in FIG. 6A, for instance, the client 614 has presented a request 612A that is directed to the tenant 110A. If the access policy 606 associated with the tenant 110A indicates that the client 614 is permitted to call the tenant 110A, then the request 612A will be routed to the tenant 110A. It should be appreciated that a framework or other component in the software container 108 might evaluate the request 612A. Alternately, and as discussed in greater detail below with regard to FIG. 6B, the called tenant 110 (i.e. the tenant 110A shown in FIG. 6A) might evaluate the request 612A against the appropriate access policy 606.

In addition to controlling access between tenants 110A and 110B on the same or different host computers 102, it might also be desirable to control access to data stored on the host computer 102 and/or other types of resources provided by the host computer 102. For example, data stored by one tenant 110A locally on a host computer 102 should not be accessible to other tenants 110 executing on the same host computer 102. Since tenants 110A and 110B in the same software container 108 execute in the same process, it can be difficult to restrict the ability of each tenant to access locally stored data. It might be similarly difficult to restrict access to other types of resources provided by the host computer 102 to individual tenants 110 executing in a multi-tenant software container 108 because the tenants 110 appear to the operating system executing on the host computer 102 to be the same user.

In order to address these considerations, and potentially others, the embodiments disclosed herein also include functionality for providing resource access control 610 of host resources 616. As used herein, the term host resources 616 encompasses any software or hardware resource provided by the host computer 102 that executes the multi-tenant software container 108. For example, and without limitation, host resources 616 might include operating system resources, file and block data storage resources, networking resources, hardware resources, and others. Secure access might also be provided to other resources provided by the host computer 102 not specifically identified above.

In order to provide secure access to the host resources 616, the software container 108 or another component, such as a security manager 412 (not shown in FIG. 6A), provides resource access control 610 for the host resources 616. In particular, the TIAPM service provides an access policy 606 for the host resources 616. The access policy 606 for the host resources 616 identifies the components that are permitted to access the host resources 616. For example, and without limitation, the access policy 606 for the host resources 616 might indicate that the tenant 110A is authorized to access the host resources 616.

When a request 612C is received to access the host resources 616, resource access control 610 is utilized to determine whether the request 612C to access the host resources 616 should be granted. In order to make this determination, the software container 108 or another component determines whether the trusted identity 604A in the received request 612C is identified in the appropriate access policy 606 as being authorized to access the host resources 616. Access to the host resources 616 will be permitted if the access policy 606 indicates that the entity making the request (i.e. the tenant 110A in the example shown in FIG. 6A) is permitted to access the host resources 616. Otherwise the request will be denied. Additional details regarding the mechanisms presented herein for security isolation of tenants 110 in a multi-tenant software container 108 will be described below with regard to FIG. 6B.

In a similar manner to that described above with regard to host resources 616, resource access control 610 might also be utilized to provide secure access to container resources (not shown in FIG. 6A), virtual machine resources 116 (shown in FIG. 1), and other types of resources. Container resources are resources provided by the multi-tenant software container 108. As described above with regard to FIG. 1, virtual machine resources 116 are resources provided by a virtual machine 106.

FIG. 6B is a software architecture diagram illustrating aspects of another mechanism disclosed herein for security isolation of the tenants 110 of a multi-tenant software container 108. In the embodiment shown in FIG. 6B, each of the tenants 110A and 110B in the software container 108 have been configured with identity-based access control 608. In particular, the tenant 110A has been configured with identity-based access control 608C and the tenant 110B has been configured with identity-based access control 608D. In this way, the tenants 110A and 110B themselves can evaluate incoming requests in view of the appropriate access policy 606.

In the example shown in FIG. 6B, for instance, a request 612A has been received at the tenant 110A that includes the trusted identity 604C associated with the calling client 614. In this example, the identity-based access control 608C within the tenant 110A is utilized to evaluate the request 612A against the appropriate access policy 606 (i.e. the access policy 606 for the tenant 110A). The request 612A will be granted if the access policy 606 indicates that the client 614 is authorized to access the tenant 110A.

In the example shown in FIG. 6B, the tenant 110A has also submitted a request 612D to access the tenant 110B. In this example, the identity-based access control 608D within the tenant 110B is utilized to evaluate the request 612D against the appropriate access policy 606 (i.e. the access policy 606 for the tenant 110B). The request 612D will be granted if the access policy 606 indicates that tenant 110A is authorized to access the tenant 110B.

It should be appreciated that the mechanisms described above for security isolation are illustrative and that other mechanisms for security isolation of tenants 110 executing in a multi-tenant software container 108 might also be utilized. It should also be appreciated that, in order to effectively implement some of the concepts described above for security isolation, it may be necessary to configure the multi-tenant software container 108 to prohibit certain types of activities. For example, and without limitation, it may be necessary to configure the multi-tenant software container 108 such that the tenants 110 cannot execute native code (e.g. JAVA or C++). It might also be necessary to disable or restrict tenants 110 from accessing other types of functionality such as, but not limited to, attaching a debugger, utilizing reflection, utilizing bytecode weaving 204, and/or accessing other features or mechanisms that might be utilized to defeat the security isolation functionality described above.

FIG. 7 is a flow diagram showing aspects of one illustrative routine 700 disclosed herein for security isolation of the tenants 110 of a multi-tenant software container 108. The routine 700 begins at operation 702, where a trusted identity 604 is assigned to the tenants 110 of a software container 108 for which security isolation is desirable. As mentioned above, it is not necessary to enable all of the tenants 110 in a container for security isolation in the manner disclosed herein. As also mentioned above, the TIAPM service 602 may be utilized to assign the trusted identities 604 to the tenants 110. Other mechanisms might also be utilized for providing the tenants 110 with a trusted identity 604.

From operation 702, the routine 700 proceeds to operation 704, where identity-based access control 608 is implemented in the software container 108 and/or in the tenants 110. As mentioned above with regard to FIG. 6A, a framework or other component in the software container 108 might implement the identity-based access control 608. Alternately, and as discussed above with regard to FIG. 6B, the tenants 110 in the software container 108 might implement the identity-based access control 608 directly. Other implementations might also be utilized.

From operation 704, the routine 700 proceeds to operation 706, where various components tasked with identity-based access control receive an appropriate access policy from the TIAPM service 602. For example, when the tenants 110 implement the identity-based access control 608 directly, each tenant 110 might receive an access policy 606 defining the components that are authorized to access it. Similarly, the service 618 might receive an access policy 606 defining the components that are permitted to access it.

From operation 706, the routine 700 proceeds to operation 708, where a request 612 is received to access a tenant 110. As discussed above, such a request 612 might be received from another tenant 110 or from outside the software container 108, such as the request 612A received from the client 614 in the example shown in FIGS. 6A and 6B. From operation 708, the routine 700 proceeds to operation 710.

At operation 710, the identity 604 specified in the received request 612 is utilized in conjunction with the appropriate access policy 606 to determine if the request 612 is to be granted or denied. For example, if a request 612D is received to access the tenant 110B, the access policy 606 associated with the tenant 110B may be utilized to determine if the trusted identity 604A associated with the received request 612D is authorized to access the tenant 110B.

If the request 612 is to be granted, the routine 700 proceeds from operation 712 to operation 714, where the request 612 is granted. If the request 612 is to be denied, the routine 700 proceeds from operation 712 to operation 716, where the request is denied. From operations 714 and 716, the routine 700 proceeds to operation 718, where it ends. It should be appreciated that requests 612 generated by a tenant 110 for access to host resources 616 and requests 612 generated by a tenant 110 for access to other services 618 might be processed in a similar manner.

It should be appreciated that, in some embodiments, the tenants 110 might not require a trusted identity 604 for all types of requests for access. In these embodiments, the tenant 110 might first determine whether a trusted identity 604 is required in response to receiving a request 612. If a trusted identity 604 is not required, then the access request may be granted without examination of a trusted identity 604. If a trusted identity 604 is required, the tenants 110 might perform the processing described above with regard to FIG. 6 to determine whether an access request is to be granted based upon the supplied trusted identity 604 and the access policy associated with the tenant or resource for which access has been requested.

Fault Isolation

As discussed briefly above, mechanisms are also provided herein for fault isolation that may be utilized to prevent tenants 110 in a multi-tenant software container 108 from causing faults and/or other types of problem conditions that impact the execution of other tenants 110 in the same software container 108. The mechanisms disclosed herein for fault isolation might also prevent tenants 110 from performing malicious and/or unintentional actions that might impact the operation of another tenant 110 and/or the software container 108. Additional details regarding these mechanisms are described below with regard to FIGS. 8-11.

Shutdown Requests

Figure 8:
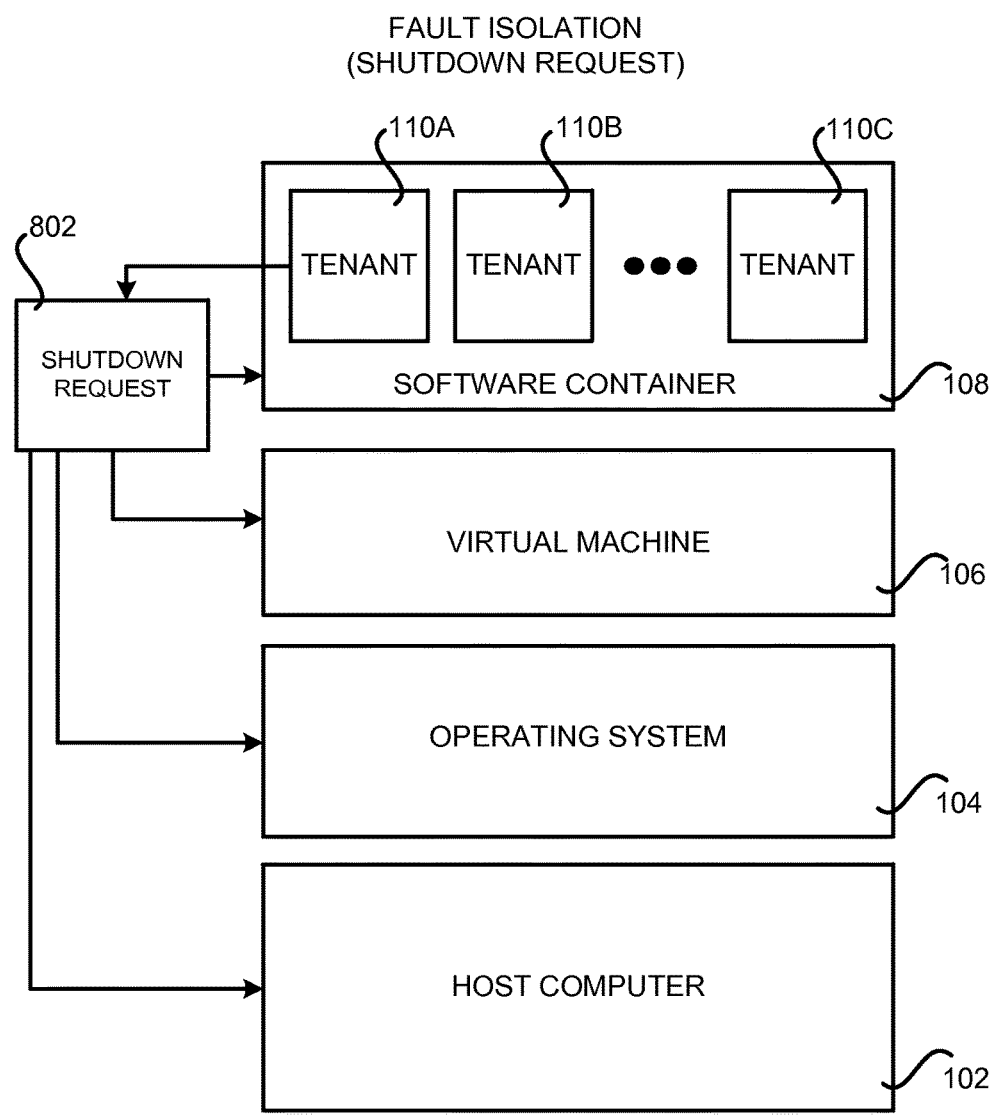
FIG. 8 is software architecture diagram showing aspects of one mechanism disclosed herein for fault isolation of tenants in a multi-tenant software container.

As shown in FIG. 8, a tenant 110A might issue a shutdown request 802 to the software container 108, the virtual machine 106, the operating system 104 or the host computer 102. If other tenants 110, such as the tenants 110A and 110B, are executing in the same software container 108, such a shutdown request 802 will cause these tenants 110A and 110B to also be shut down.

In order to address the possibility described above, bytecode weaving 204 or another mechanism may be utilized to intercept a shutdown request 802 issued by one of the tenants 110 executing in a multi-tenant software container 108. If no other tenants 110 are executing in the same multi-tenant software container 108, then the shutdown request 802 may be permitted. If, however, other tenants 110 are executing in the same software container 108, then the shutdown request 802 may be denied. Additionally, other actions might also be taken, such as informing the tenant 110A that issued the shutdown request 802 that the request 802 was denied, shutting down only the tenant 110A that issued the shutdown request 802, and/or other types of actions. It should be appreciated that certain types of tenants 110, such as privileged tenants 110, might be permitted to shut down the software container 108, the virtual machine 106, the operating system 104 and/or the host computer 102. Additional details regarding this mechanism are described below with regard to FIG. 9.

Figure 9:
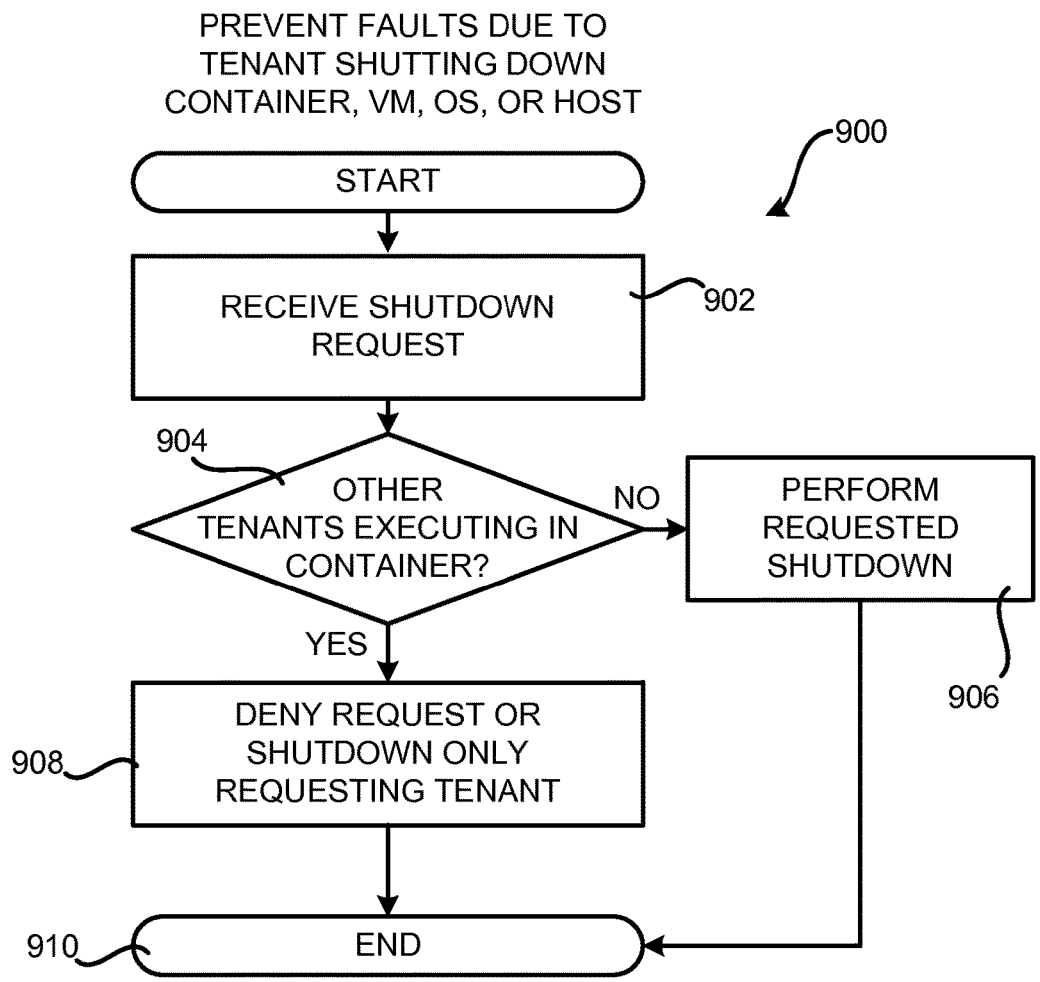
FIG. 9 is a flow diagram showing aspects of one illustrative routine disclosed herein for fault isolation of tenants in a multi-tenant software container.

FIG. 9 is a flow diagram showing aspects of one illustrative routine 900 disclosed herein for isolation of tenants 110 in a multi-tenant software container 108 from shutdown requests 802 issued by other tenants 110. The routine 900 begins at operation 902, where a shutdown request 802 is generated by one of the tenants 110 in a multi-tenant software container 108. As mentioned above, bytecode weaving 204 and/or other technologies might be utilized to determine that a tenant 110 has issued a shutdown request 802 to the software container 108, to the virtual machine 106, to the operating system 104, or to the host computer 102.

From operation 902, the routine 900 proceeds to operation 904, where a determination is made as to whether other tenants 110 are executing in the multi-tenant software container 108. If no other tenants 110 are executing in the multi-tenant software container 108, the routine 900 proceeds from operation 904 to operation 906, where the shutdown request 802 is performed. From operation 906, the routine 900 proceeds to operation 910, where it ends.

If, at operation 904, it is determined that other tenants 110 are executing in the multi-tenant software container 108, the routine 900 proceeds from operation 904 to operation 908. At operation 908, the shutdown request 802 is denied. As mentioned above, other actions might also be taken such as, for example, shutting down the tenant 110 that submitted the shutdown request 802, notifying the tenant 110 that submitted the shutdown request 802 that the request 802 has been denied, and/or another type of action. From operation 908, the routine 900 proceeds to operation 910, where it ends.

Resource Exhaustion

The exhaustion of certain types of resources by a tenant 110 in a multi-tenant software container 108 might result in a fault that impacts other tenants 110 executing in the same multi-tenant software container 108. For example, and without limitation, running out of heap 270 memory, permanent generation 272 memory, disk space, file descriptors, or other types of resources might induce a fault or other problem condition that impacts all of the tenants 110 of a multi-tenant software container 108. In order to address these possibilities, bytecode weaving 204 may be utilized to enforce a quota on the tenants' 110 utilization of certain types of resources. For example, and without limitation, bytecode weaving might be utilized to instrument each tenant 110 and enforce a per-tenant quota on the amount of disk space utilized.

Other mechanisms might also be utilized to restrict the amount of memory or disk space that a tenant 110 is permitted to allocate. For example, the virtual machine 106 might be modified to keep track of the amount of various types of memory (e.g. heap 270, permanent generation 272, etc.) and/or disk utilized by each tenant 110, and to restrict each tenant 110 from allocating more than some predetermined amount of a particular memory type and/or from utilizing other types of resources beyond a predefined threshold. In particular, the loading of classes by each tenant 110 might be instrumented in order to determine the amount of memory utilized by each tenant 110 and to enforce a per-tenant quota thereupon. The quota might be enforced based upon a total amount of memory or disk utilized by a tenant 110 or based upon an amount of memory or disk utilized by the tenant 110 during some time period (e.g. one second or one hour). Objects and/or files utilized in excess of the specified threshold might be deleted.

As another example, static code analysis might be utilized to determine the amount of permanent generation or other resources required to execute a tenant 110. The tenant 110 may then be permitted to execute in the container 108 or denied execution depending upon the amount of permanent generation and/or other resources utilized by the tenant 110.

Another mechanism that might be utilized to restrict the amount of memory utilized by a tenant 110 is to limit the number of active releases (i.e. versions of the same tenant) per tenant 110 in the software container 108. Tenants 110 running multiple versions in the same process at the same time may result in a significant utilization of permanent generation and/or other resources. However, by restricting the number of active releases per tenant 110, the amount of permanent generation and/or other types of resources utilized by each tenant 110 might be limited.

Another mechanism that might be utilized to restrict the amount of memory utilized by a tenant 110 is to load each tenant 110 into main memory only when the tenant 110 is being utilized. When a tenant 110 is not being utilized, the tenant 110 and its associated objects and metadata may be paged out to disk or a memory location outside of that reserved for the virtual machine 106. When a request is subsequently received for the tenant 110, the tenant 110 and its related objects and metadata may be loaded back into the portion of memory utilized by the virtual machine 106 and executed.

Some virtual machines 106 utilize a string table that is utilized to provide efficient lookup for interned strings. Such a string table is not, however, typically resized when it grows. Consequently, interning a significant number of strings can cause lookups on the string table to become drastically slower. While significant utilization of the string table would not likely cause a fault, it might cause a significant performance penalty depending upon the manner in which it is utilized. So, mechanisms such as bytecode weaving 204 may be utilized to determine the manner in which tenants 110 are utilizing the string table and to take various actions (e.g. limiting further string creation) depending upon each tenant's utilization of the string table.

It is also possible for certain conditions to arise that cause the host computer 102 to run out of memory. For example, and without limitation, the virtual machine 106 may allocate a sufficient amount of memory to cause the host computer 102 to run out of memory. As another example, a process external to the virtual machine 106 might allocate a sufficiently significant amount of memory to cause the host computer 102 to run out of memory. Memory leaks within the virtual machine 106 and/or the software container 108 might also cause the host computer 102 to run out of memory. A tenant 110 might also allocate a significant number of file descriptors and/or sockets that cause the virtual machine 106 to allocate additional memory that results in the host computer 102 running out of memory.

Various actions might be taken in order to prevent the host computer 102 from running out of memory due to the conditions described above. For example, and without limitation, the virtual machine 106 might be configured in order to prevent the tenants 110 from running native code that might utilize host memory directly. As another example, bytecode weaving 204 and/or a security manager 412 might be utilized to prevent tenants 110 from allocating an excessive number of file descriptors, network sockets, and/or other resources. As a further example, a quota might be enforced per tenant 110 that limits that amount of memory utilized.

Creation of new processes by a tenant 110 might also impact other tenants 110 in the same multi-tenant software container 108 by generating an out-of-memory condition. In order to prevent this possibility, bytecode weaving 204 and/or a security manager 412 might be utilized to limit the number of new processes that can be created by a tenant 110. Additional details are provided below with regard to FIG. 10 regarding the mechanisms described above for prevention of faults due to resource exhaustion.

Figure 10:
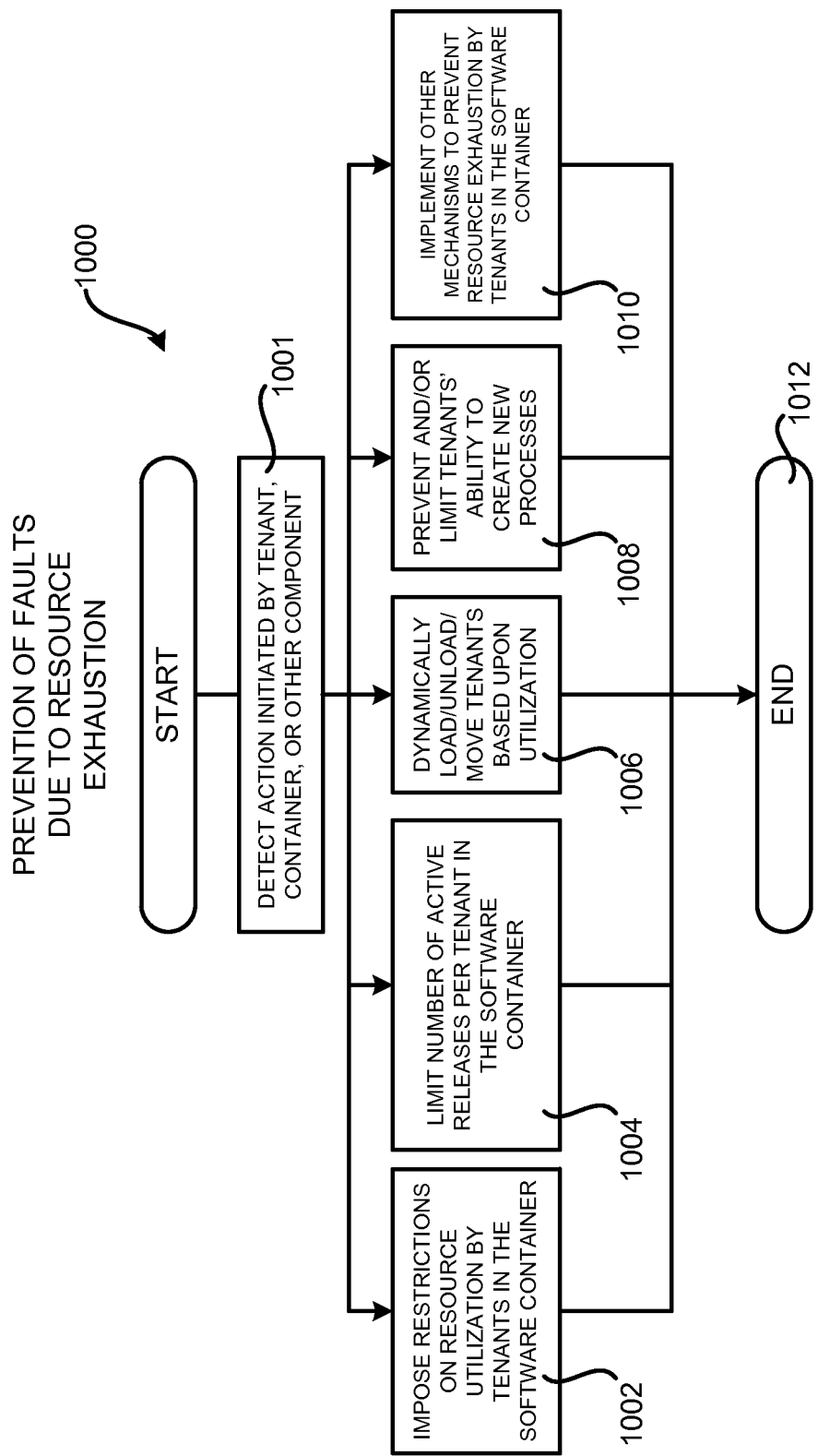
FIG. 10 is a flow diagram showing aspects of one illustrative routine for prevention of faults that might impact tenants in a multi-tenant software container due to resource exhaustion.

FIG. 10 is a flow diagram showing aspects of one illustrative routine 1000 for prevention of faults that might impact tenants 110 in a multi-tenant software container 108 due to resource exhaustion. The routine 1000 begins at operation 1001, where an action is detected that is initiated by a tenant 110, a container 108, or another component, such as an operating system or a virtual machine. For example, and without limitation, a tenant might request to allocate resources, to deploy a new release to a container 108, to create a new process, and/or to take another type of action.

In response to detecting such an action, or in response to another type of stimulus, various types of operations might be performed in order to prevent the detected action from causing a fault that might affect tenants 110 executing in the multi-tenant software container 108. For example, and without limitation, at operation 1002, restrictions might be imposed on the ability of the tenants 110 in the multi-tenant software container 108 to utilize various resources provided by the virtual machine 106, the operating system 104, and/or the host computer 102. As mentioned above, for example, bytecode weaving 204 might be utilized to monitor the loading of classes by the tenants 110 and to impose restrictions on the amount of memory utilized by the tenants 110.

Other mechanisms might also be utilized to monitor and/or restrict the amount of memory and other types of resources utilized by the tenants 110 in order to prevent a fault condition that might impact other tenants 110. For example, and without limitation, mechanisms might be implemented to monitor and restrict the utilization of disk storage, host memory, virtual machine memory, a string table, file descriptors, network sockets, and other types of resources.

As another example, at operation 1004 the software container 108 might limit the number of active releases that each tenant 110 might have in the software container 108. As mentioned above, the number of active releases of each tenant 110 utilizes permanent generation 272 and other types of resources. Accordingly, by limiting the number of active releases that each tenant 110 might have in the software container 108 at one time, exhaustion of these resources may be prevented.

As another example, at operation 1006 tenants 110 and/or their objects and metadata might be unloaded based upon demand for the tenants 110. As discussed above, for example, idle tenants 110 and/or their objects and metadata might be swapped to disk and/or another location in memory. When a request is received for a tenant 110 that has been swapped out, the tenant 110 and/or its objects may be reloaded and executed in order to process the incoming request. Tenants 110 might also be moved to a different container 108 or host computer based upon their utilization.

As another example, at operation 1008 the ability of the tenants 110 to create new processes external to the software container 108 might be limited. As mentioned above, the creation of new processes by a tenant 110 might consume significant amounts of memory and/or cause other problems. Accordingly, in order to prevent this possibility, the virtual machine 106 and/or the software container 108 might be configured such that the tenants 110 cannot create new processes. For example, the ability of the tenants 110 to execute native code might be restricted in order to prevent the tenants 110 from creating new processes. Bytecode weaving 204 and/or a security manager 412 might also be utilized to prevent tenants 110 from creating new processes. Other mechanisms might also be utilized.

Other mechanisms might also be implemented at operation 1010 in order to prevent resource exhaustion by tenants 110 executing in the multi-tenant software container 108. For example, and without limitation, the entire multi-tenant software container 108 might be migrated to a different host computer. The routine 1000 ends at operation 1012.

Errors

Tenants 110 in a multi-tenant software container 108 might also throw errors that result in the software container 108 or the virtual machine 106 shutting down. In order to address this possibility, bytecode weaving 204 may be utilized to intercept these errors and make an appropriate response. For example, depending upon the type of error it may be desirable to shut down the software container 108 and/or the virtual machine 106. For other types of errors it may not be necessary or desirable to shut down the software container 108 or the virtual machine 106. Other types of actions might also be taken based upon the type of error thrown by a tenant 110 of the multi-tenant software container 108.

In order to implement this functionality, bytecode weaving 204 may be utilized to instrument an error and/or any of its subclasses when a tenant 110 or another component creates the error. When an error is generated, the context that the error was generated in may be determined by examining a stack trace and/or other information. Based upon the determined context, the tenant 110 or other component generating the error may be permitted to create the error, or prevented from creating the error. If the tenant 110 or other component is not permitted to create the error, the tenant 110 can be prevented from shutting down the virtual machine 106 or taking other actions that might impact other tenants 110 of the multi-tenant software container 108.

Routing Conflicts Between Tenants

Each tenant 110 in a multi-tenant software container 108 has its own URI prefix or other type of identifier that clients may utilize to route to the tenant 110. Any tenant 110, however, can claim to have any arbitrary identifier (e.g. URI prefix). Conflicts can arise, therefore, when two tenants 110 in the same multi-tenant container 108 have the same identifier. In order to address this possibility, an exception can be thrown when a tenant 110 tries to utilize an existing identifier (i.e. a URI prefix in use by another tenant 110 in the same multi-tenant software container 108). Other mechanisms might also be utilized to prevent tenants 110 executing in the same multi-tenant software container 108 from obtaining identical identifiers. Other mechanisms might also be utilized to prevent other types of routing conflicts between tenants 110 in the same multi-tenant software container 108.

Native Code

Tenants 110 in the multi-tenant software container 108 may utilize native code (e.g. assembly code) in order to shut down the software container 108, the virtual machine 106, the operating system 104 and/or the host computer 102. Native code might also be utilized in other ways that may generate a fault or otherwise negatively impact other tenants 110 executing in the same multi-tenant software container 108. In order to address this possibility, and potentially others, the virtual machine 106 may be configured to prevent tenants 110 from loading native code. Alternatively, native code utilized by tenants 110 might be executed in a sandbox. In this way, native code may be executed in a trusted manner but undesirable activities (e.g. launching processes outside of the software container 108) performed by the native code may be prohibited.

Passed Objects

In some embodiments, a tenant 110A of a multi-tenant software container 108 may be permitted to pass an object, or a reference to an object, to another tenant 110B in the same container 108. If the object is mutable and the calling tenant 110A maintains a reference to the object, the calling tenant 110A can manipulate the passed object even after the called tenant 110B has performed its checks on the passed object. Manipulation of the passed object might, however, create problems with execution of the called tenant 110B. In order to address this possibility, bytecode weaving 204 might be utilized to make objects passed between tenants 110 immutable. In this way, the calling tenant 110A cannot manipulate a passed object once the object has been passed to the called tenant 110B. Other mechanisms might also be utilized in order to prevent tenants 110 from passing mutable objects to other tenants 110 in the same multi-tenant software container 108.

Read-Only File System

A tenant 110 might cause a fault impacting other tenants 110 in the same multi-tenant software container 108 if the tenant 110 causes the local file system to become read-only. To prevent this possibility, the virtual machine 106 might be executed by a user that does not have permission to remount the local file system. Alternately, or in addition thereto, each tenant 110 might be prohibited from running operating system shell commands that might be utilized to remount the local file system as read-only. Other mechanisms might also be utilized to prevent tenants 110 from causing the local file system to become read-only.

In a similar manner, the virtual machine 106 might be executed by a user that does not have other types of permissions, such as permissions to reconfigure a network interface or firewall. In this manner, tenants 110 might be prohibited from making other types of configuration changes that might impact the execution of other tenants 110 in the same multi-tenant software container 108. Additional details regarding these processes are provided below with regard to FIG. 11.

Figure 11:
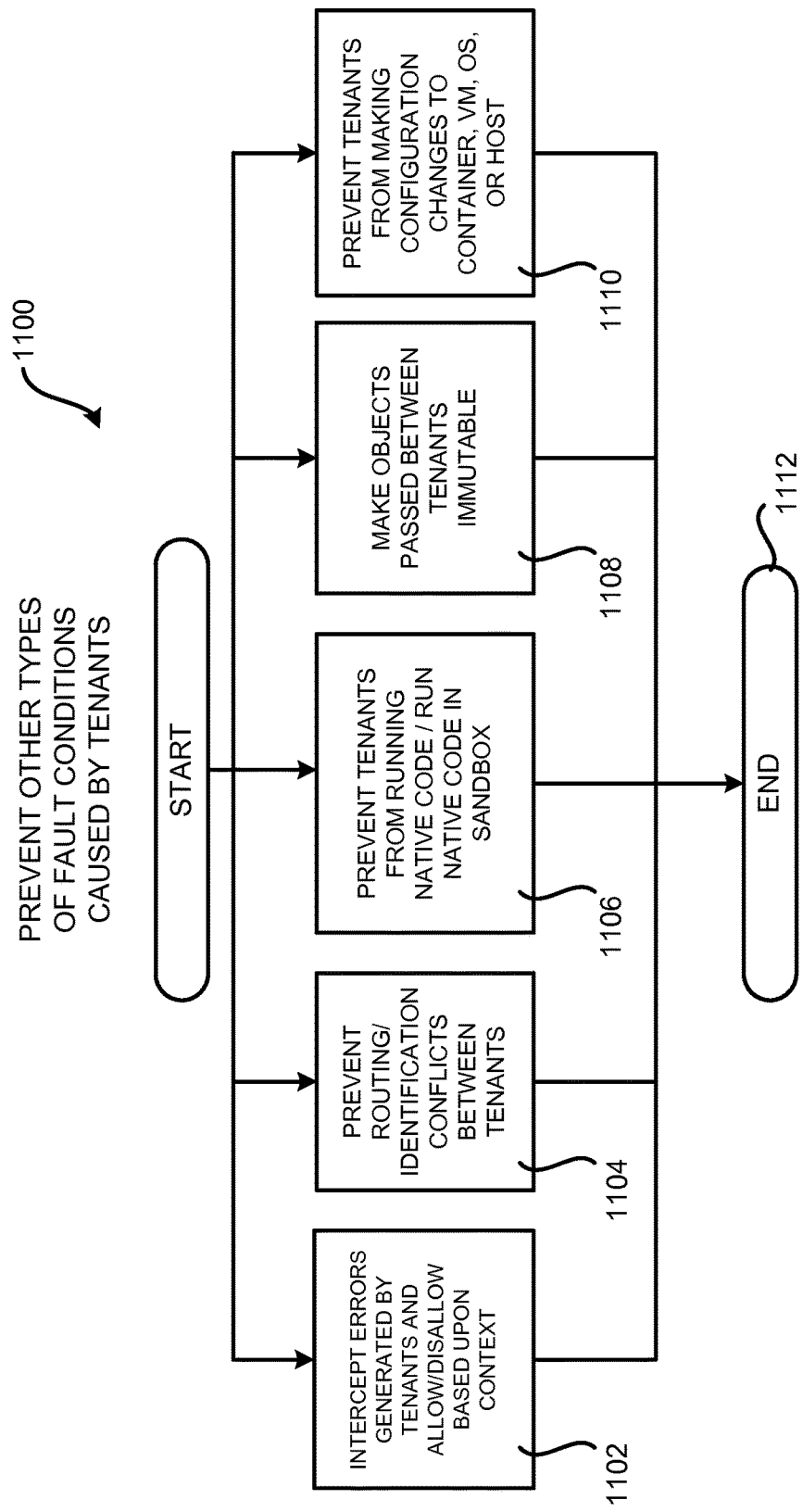
FIG. 11 is a flow diagram showing aspects of one illustrative routine disclosed herein for prevention of various types of fault conditions caused by tenants of a multi-tenant software container.

FIG. 11 is a flow diagram showing aspects of one illustrative routine 1100 disclosed herein for prevention of fault conditions other than resource exhaustion caused by tenants 110 of a multi-tenant software container 108. In particular, the routine 1100 shows various mechanisms that might be utilized to prevent other types of fault conditions caused by the tenants 110. For example, at operation 1102 errors generated by tenants 110 might be intercepted and allowed or disallowed based upon the context in which they are generated. As discussed above, for example, a stack trace and/or other information may be examined in order to determine the context in which the error was generated. Based upon this context, the tenant may be permitted to generate the error or the error may be prohibited.

At operation 1104, various mechanisms might be implemented in order to prevent routing conflicts between tenants 110 in a container 108. For example, and without limitation, different tenants 110 in the same software container 108 may be prevented from utilizing the same URI or other type of identifier. As mentioned above, utilization of the same identifier by different tenants 110 in the same software container 108 might cause a fault condition due to routing conflicts. In order to address this possibility, an exception can be thrown when a tenant 110 tries to utilize an identifier that is currently in use by another tenant 110. Other mechanisms might also be utilized to prevent routing conflicts between tenants 110 executing in the same multi-tenant software container 108.

At operation 1106, tenants 110 may be prohibited from executing native code (e.g. assembly code). Alternately, if it is desirable to permit tenants 110 to execute native code, the native code might be executed in a sandboxed environment that limits the ability of the native code to perform certain types of potentially harmful actions. Other mechanisms might also be utilized to permit the tenants 110 to execute native code in a way not likely to cause a fault that might impact other tenants 110 in the multi-tenant software container 108.

At operation 1108, bytecode weaving 204 or another suitable mechanism is utilized in order to make objects passed between tenants 110 immutable. In this way, one tenant 110 cannot manipulate an object that has been passed to another tenant 110. Other mechanisms might also be utilized in order to prevent tenants 110 from passing mutable objects to other tenants 110 in the same multi-tenant software container 108.

At operation 1110, tenants 110 executing in the multi-tenant software container 108 may be prevented from making configuration changes to the software container 108, the virtual machine 106, the operating system 104, and/or the host computer 102 that might cause a fault impacting other tenants 110 in the software container 108. For example, and as described above, the tenants 110 might be prevented from remounting the local file system as read-only, from reconfiguring a network interface on the host computer 102, or reconfiguring a firewall implemented by the operating system 104. Various mechanisms might be utilized to prevent the tenants 110 from making configuration changes, some of which have been described above. Other mechanisms might also be described for preventing other types of fault conditions caused by tenants 110 of a multi-tenant software container 108. The routine 1000 ends at operation 1112.

Figure 12:
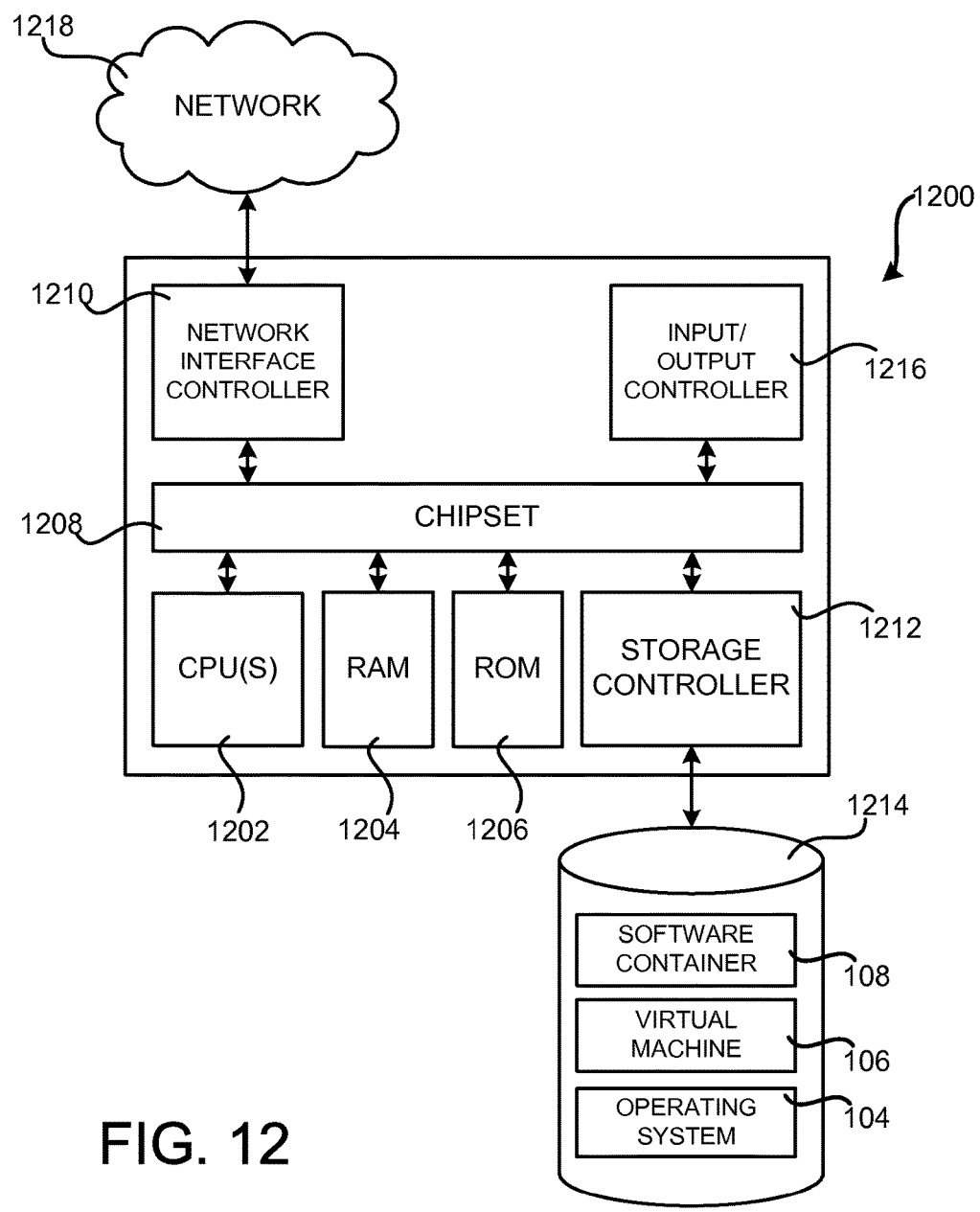
FIG. 12 is a computer architecture diagram showing an illustrative computer hardware architecture for computing devices described in embodiments presented herein.

FIG. 12 shows an example computer architecture for a computer 1200 capable of executing the software components described herein for isolation of tenants executing in a multi-tenant software container. The computer architecture shown in FIG. 12 illustrates a conventional server computer, workstation, desktop computer, laptop, network appliance, tablet computing device, electronic book reader, digital cellular phone, or other computing device, and may be utilized to execute any aspects of the software components presented herein. For example, and without limitation, the computer architecture shown in FIG. 12 might be utilized to implement computer systems that execute one or more software components for implementing the functionality described above. Other types of hardware architectures might also be utilized.

The computer 1200 includes a baseboard, or "motherboard," which is a printed circuit board to which a multitude of components or devices may be connected by way of a system bus or other electrical communication paths. In one illustrative embodiment, one or more central processing units ("CPUs") 1202 operate in conjunction with a chipset 1208. The CPUs 1202 are standard programmable processors that perform arithmetic and logical operations necessary for the operation of the computer 1200.

The CPUs 1202 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1208 provides an interface between the CPUs 1202 and the remainder of the components and devices on the baseboard. The chipset 1208 may provide an interface to a random access memory ("RAM") 1204, used as the main memory in the computer 1200. The chipset 1208 may further provide an interface to a computer-readable storage medium such as a read-only memory ("ROM") 1206 or non-volatile RAM ("NVRAM") for storing basic routines that help to startup the computer 1200 and to transfer information between the various components and devices. The ROM 1206 or NVRAM may also store other software components necessary for the operation of the computer 1200 in accordance with the embodiments described herein.

According to various embodiments, the computer 1200 may operate in a networked environment using logical connections to remote computing devices and computer systems through the network 1218, such as a LAN, a WAN, the Internet, or any other networking topology known in the art that connects the computer 1200 to remote computers. The chipset 1208 includes functionality for providing network connectivity through a network interface controller ("NIC") 1210, such as a gigabit Ethernet adapter. The NIC 1210 is capable of connecting the computer 1200 to other computing devices over the network 1218. It should be appreciated that multiple NICs 1210 may be present in the computer 1200, connecting the computer 1200 to various types of networks and remote computer systems.

The computer 1200 may be connected to a mass storage device 1214 that provides non-volatile storage for the computer 1200. The mass storage device 1214 may store system programs, application programs, other program modules, and data, which are described in greater detail herein. The mass storage device 1214 may be connected to the computer 1200 through a storage controller 1212 connected to the chipset 1208. The mass storage device 1214 may consist of one or more physical storage units. The storage controller 1212 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 1200 may store data on the mass storage device 1214 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1214 is characterized as primary or secondary storage, and the like. For example, the computer 1200 may store information to the mass storage device 1214 by issuing instructions through the storage controller 1212 to alter the magnetic characteristics of a particular location within a magnetic disk drive unit, the reflective or refractive characteristics of a particular location in an optical storage disk, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 may further read information from the mass storage device 1214 by detecting the physical states or characteristics of one or more particular locations within the physical storage units.

In addition to the mass storage device 1214 described above, the computer 1200 may have access to other computer-readable storage media to store and retrieve information, such as program modules, data structures, or other data. It should be appreciated by those skilled in the art that computer-readable storage media can be any available non-transitory media that may be accessed by the computer 1200. By way of example, and not limitation, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1214 may store an operating system 104 utilized to control the operation of the computer 1200. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 1214 may store other system or application programs and data utilized by the computer 1200. For example, the mass storage device 1214 may store the virtual machine 106 and the software container 108 described above. The mass storage device 1214 might also store other programs and data not specifically identified herein.

In one embodiment, the mass storage device 1214 or other computer-readable storage media may be encoded with computer-executable instructions that, when loaded into the computer 1200, may transform the computer from a general-purpose computing system into a special-purpose computer capable of implementing the embodiments described herein. These computer-executable instructions transform the computer 1200 by specifying how the CPUs 1202 transition between states, as described above. According to one embodiment, the computer 1200 may have access to computer-readable storage media, such as an optical disk, a solid-state storage device, or a magnetic storage device, storing computer-executable instructions that, when executed by the computer 1200, perform the various routine described above with regard to FIGS. 3, 5, 7, 9, 10 and 11.

The computer 1200 might also include an input/output controller 1216 for receiving and processing input from a number of input devices, such as a keyboard, a mouse, a touchpad, a touch screen, an electronic stylus, and/or other type of input device. Similarly, the input/output controller 1216 may provide output to a display, such as a computer monitor, a flat-panel display, a digital projector, a printer, a plotter, or other type of output device. It will be appreciated that the computer 1200 may not include all of the components shown in FIG. 12, may include other components that are not explicitly shown in FIG. 12, or may utilize an architecture completely different than that shown in FIG. 12.

Based on the foregoing, it should be appreciated that various concepts and technologies for isolating tenants executing in multi-tenant software containers have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

Embodiments of the disclosure can be described in view of the following clauses:

1. A non-transitory computer-readable storage medium having computer-executable instructions stored thereupon which, when executed by a computer, cause the computer to:
  monitor the utilization of one or more resources by a plurality of tenants executing in a multi-tenant software container using one or more of bytecode weaving, interception, or shadow environments;
  determine, based upon the monitoring, whether a tenant of the plurality of tenants is utilizing resources in excess of a specified threshold; and
  in response to determining that a tenant is utilizing resources in excess of a specified threshold, cause one or more actions to be taken with regard to the tenant that is utilizing resources in excess of the specified threshold.

2. The non-transitory computer-readable storage medium of clause 1, wherein the one or more resources comprise one or more of disk space, CPU cycles, system memory, permanent generation, young generation, old generation, disk I/O operations, disk bandwidth, network I/O operations, network bandwidth, load balancer connections, file descriptors, processes, or execution threads.

3. The non-transitory computer-readable storage medium of clauses 1-2, wherein the one or more actions to be taken with regard to the tenant that is utilizing resources in excess of the specified threshold comprise one or more of denying a resource request from the tenant, redirecting a resource request, evicting the tenant from the multi-tenant software container, moving the tenant to another multi-tenant software container, reducing CPU cycles allocated to the tenant, pausing execution of the tenant or throttling execution of the tenant.

4. The non-transitory computer-readable storage medium of clauses 1-3, wherein the utilization of the one or more resources by the plurality of tenants is monitored by one or more of memory dumps or tracing tools.

5. The non-transitory computer-readable storage medium of clauses 1-4, wherein the bytecode weaving is performed at a virtual machine level and wherein interception is performed at an operating system level.

6. An apparatus for isolating the utilization of resources by a plurality of tenants executing in a multi-tenant software container, the apparatus comprising:
  a processor; and
  a computer-readable storage medium having computer-executable instructions stored thereupon which, when executed by the processor, cause the apparatus to
  monitor the utilization of the resources by the plurality of tenants executing in the multi-tenant software container, and take one or more actions with respect to a tenant of the plurality of tenants that utilizes a resource in excess of a specified threshold.

7. The apparatus of clause 6, wherein at least one of the resources comprises execution threads, and wherein the computer-readable storage medium has further computer-executable instructions stored thereupon which, when executed by the processor, cause the apparatus to
maintain a per tenant counter for the plurality of tenants indicating a number of execution threads created by the plurality of tenants, and
utilize the counter to prevent the plurality of tenants from creating threads in excess of a specified thread cap.

8. The apparatus of clause 7, wherein the counter is generated using one or more of bytecode weaving, interception, or tracing.

9. The apparatus of clauses 7-8, wherein at least one of the resources comprises execution threads, and wherein the computer-readable storage medium has further computer-executable instructions stored thereupon which, when executed by the processor, cause the apparatus to
maintain data identifying execution threads created by the plurality of tenants, and
utilize the data to reap the execution threads created by a tenant if the tenant is removed from the multi-tenant software container.

10. The apparatus of clauses 7-9, wherein the computer-readable storage medium has further computer-executable instructions stored thereupon which, when executed by the processor, cause the apparatus to
associate a directory on a file system with a tenants, and
prevent the tenant from writing to a directory on the file system other than the directory that is associated with the tenant.

11. The apparatus of clauses 7-10, wherein the computer-readable storage medium has further computer-executable instructions stored thereupon which, when executed by the processor, cause the apparatus to
associate a disk quota with a tenant, and
prevent the tenant from writing an amount of data to a file system in excess of the disk quota associated with the tenant.

12. The apparatus of clauses 7-11, wherein at least one of the resources comprises file descriptors, and wherein the computer-readable storage medium has further computer-executable instructions stored thereupon which, when executed by the processor, cause the apparatus to
maintain a per tenant counter for the plurality of tenants indicating a number of file descriptors created by the plurality of tenants, and
utilize the counter to prevent the plurality of tenants from creating file descriptors in excess of a specified file descriptor cap.

13. The apparatus of clauses 7-12, wherein at least one of the resources comprises memory, and wherein the computer-readable storage medium has further computer-executable instructions stored thereupon which, when executed by the processor, cause the apparatus to
maintain a per tenant counter for the plurality of tenants indicating an amount of memory utilized by the plurality of tenants, and
utilize the counter to prevent the plurality of tenants from utilizing memory in excess of a specified cap.

14. The apparatus of clauses 7-13, wherein the per tenant counter is generated by bytecode weaving a virtual machine, and wherein the memory comprises one or more of permanent generation, young generation, or old generation.

15. The apparatus of clauses 7-14, wherein the computer-readable storage medium has further computer-executable instructions stored thereupon which, when executed by the processor, cause the apparatus to execute the tenants in individual shadow environments in order to monitor the utilization of the resources by the plurality of tenants.

16. A computer-implemented method for isolating the utilization of one or more resources by a plurality of tenants executing in a multi-tenant software container, the method comprising:
monitoring the utilization of the one or more resources by the plurality of tenants executing in the multi-tenant software container; and
causing one or more actions to be taken with respect to a tenant of the plurality of tenants that utilizes a resource of the one or more resources in excess of a specified threshold.

17. The computer-implemented method of clause 16, wherein the monitoring is performed by using one or more of bytecode weaving, interception, shadow environments, memory dumps, or tracing tools.

18. The computer-implemented method of clauses 16-17, wherein the one or more resources comprise one or more of disk space, CPU cycles, system memory, permanent generation, young generation, old generation, disk I/O operations, disk bandwidth, network I/O operations, network bandwidth, load balancer connections, file descriptors, or execution threads.

19. The computer-implemented method of clauses 16-18, wherein the one or more actions to be taken with regard to the tenant that utilizes a resource in excess of the specified threshold comprise one or more of denying a resource request from the tenant, evicting the tenant from the multi-tenant software container, reducing CPU cycles allocated to the tenant, pausing execution of the tenant or throttling execution of the tenant.

20. The computer-implemented method of clauses 16-19, wherein the bytecode weaving is performed at a virtual machine level and wherein interception is performed at an operating system level.

Embodiments of the disclosure might also be described in view of the following additional clauses:

1. A non-transitory computer-readable storage medium having computer-executable instructions stored thereupon which, when executed by a computer, cause the computer to:
associate a tenant classloader with a tenant executing in a multi-tenant software container;
receive a request to load a class from the tenant at the tenant classloader;
in response to receiving the request to load the class from the tenant, determine whether the class is a shared class that is shared between two or more tenants executing in the multi-tenant software container for which loading is to be delegated to a container classloader;
in response to determining that the class is not a shared class for which loading is to be delegated to the container classloader, loading the class by way of the tenant classloader; and
in response to determining that the class is a shared class for which loading is to be delegated to the container classloader, delegating loading of the class to the container classloader.

2. The non-transitory computer-readable storage medium of clause 1, wherein determining whether the class is a shared class for which loading is to be delegated to a container classloader comprises examining a package containing the class to determine if the class is a shared class for which loading is to be delegated to the container classloader.

3. The non-transitory computer-readable storage medium of clauses 1-2, wherein the shared class comprises a class for enabling communication between the tenant and another tenant executing in the multi-tenant software container.

4. The non-transitory computer-readable storage medium of clauses 1-3, wherein the shared class comprises a class for enabling communication between the tenant and the multi-tenant software container.

5. The non-transitory computer-readable storage medium of clauses 1-4, having further computer-executable instructions stored thereupon which, when executed by the computer, cause the computer to:
    implement bytecode weaving within the tenant classloader to modify the class loaded by the tenant classloader.

6. The non-transitory computer-readable storage medium of clauses 1-5, having further computer-executable instructions stored thereupon which, when executed by the computer, cause the computer to:
    implement bytecode weaving within the container classloader to modify the shared class loaded by the container classloader.

7. The non-transitory computer-readable storage medium of clauses 1-6, wherein a bootstrap classloader comprises a parent classloader for the tenant classloader and the container classloader.

8. The non-transitory computer-readable storage medium of clauses 1-7, wherein the tenant classloader and the container classloader have no parent classloader.

9. An apparatus for dependency isolation between two or more tenants executing in a multi-tenant software container, the apparatus comprising:
    a processor; and
    a computer-readable storage medium having computer-executable instructions stored thereupon which, when executed by the processor, cause the apparatus to
    receive a request from a tenant executing in the multi-tenant software container to load a class;
    in response to receiving the request from the tenant to load the class, determine whether the class is a shared class;
    in response to determining that the class is not a shared class, loading the class by way of a tenant classloader; and
    in response to determining that the class is a shared class, loading the class by way of a container classloader.

10. The apparatus of clause 9, wherein the tenant classloader is configured to receive the request from the tenant to load the class and to delegate loading of the class to the container classloader in response to determining that the class is a shared class.

11. The apparatus of clauses 9-10, wherein the determination as to whether the class is a shared class is made by examining a package containing the class to determine if the class is a shared class for which loading is to be delegated to the container classloader.

12. The apparatus of clauses 9-11, wherein the shared class comprises a class for enabling communication between the tenant and another tenant executing in the multi-tenant software container or a class for enabling communication between the tenant and the multi-tenant software container.

13. The apparatus of clauses 9-12, wherein the computer-readable storage medium has further computer-executable instructions stored thereupon which, when executed by the processor, cause the apparatus to:
    implement bytecode weaving within the tenant classloader to modify the class loaded by the tenant classloader; or
    implement bytecode weaving within the container classloader to modify the shared class loaded by the container classloader.

14. The apparatus of clauses 9-13, wherein the computer-readable storage medium has further computer-executable instructions stored thereupon which, when executed by the processor, cause the apparatus to:
    execute a security manager configured to prevent the tenant from loading unshared classes associated with a second tenant.

15. The apparatus of clauses 9-14, wherein the container classloader comprises a tenant of the multi-tenant software container.

16. A computer-implemented method for providing dependency isolation between two or more tenants executing in a multi-tenant software container, the method comprising:
    receiving a request to load a class from a tenant executing in the multi-tenant container;
    in response to receiving the request, determining if the class is a shared class that is shared between two or more tenants of the multi-tenant container;
    loading the class using a first classloader in response to determining that the class is not a shared class; and
    loading the class using a second classloader in response to determining that the class is a shared class.

17. The computer-implemented method of clause 16, wherein the first classloader comprises a tenant classloader associated with the tenant and wherein the second classloader comprises a container classloader.

18. The computer-implemented method of clauses 16-17, wherein determining if the class is a shared class that is shared between two or more tenants of the multi-tenant container comprises examining a package containing the class to determine if the class is a shared class.

19. The computer-implemented method of clauses 16-18, wherein the shared class comprises a class for enabling communication between the tenant and another tenant executing in the multi-tenant software container or a class for enabling communication between the tenant and the multi-tenant software container.

20. The computer-implemented method of clauses 16-20, further comprising:
    implementing bytecode weaving within the first classloader to modify the class loaded by the first classloader; and
    implementing bytecode weaving within the second classloader to modify the shared class loaded by the second classloader.

Embodiments of the disclosure might also be described in view of the following additional clauses:

1. A non-transitory computer-readable storage medium having computer-executable instructions stored thereupon which, when executed by a computer, cause the computer to:
    associate a trusted identity with at least a first tenant of a multi-tenant software container;
    receive an access policy for a second tenant of the multi-tenant software container;
    generate an access request from the first tenant of the multi-tenant software container to the second tenant of the multi-tenant software container, the access request comprising the trusted identity associated with the first tenant; and determine, based at least in part on the access policy for the second tenant and the trusted identity of the first tenant, whether to grant the access request received from the first tenant.

2. The non-transitory computer-readable storage medium of clause 1, wherein a framework in the multi-tenant software container is configured to determine whether to grant the access request received from the first tenant.

3. The non-transitory computer-readable storage medium of clauses 1-2, wherein the second tenant is configured to determine whether to grant the access request received from the first tenant.

4. The non-transitory computer-readable storage medium of clauses 1-3, having further computer-executable instructions stored thereupon which, when executed by the computer, cause the computer to:
   receive an access request from a client external to the multi-tenant software container directed to the second tenant of the multi-tenant software container, the access request comprising a trusted identity associated with the client; and
   determine, based at least in part on the access policy for the second tenant and the trusted identity associated with the client, whether to grant the access request received from the client external to the multi-tenant software container.

5. The non-transitory computer-readable storage medium of clauses 1-4, having further computer-executable instructions stored thereupon which, when executed by the computer, cause the computer to:
   generate an access request from the first tenant of the multi-tenant software container to a service external to the multi-tenant software container, the access request comprising the trusted identity associated with the first tenant, whereby
   the service external to the multi-tenant software container can determine whether to grant the access request received from the first tenant based at least in part on the trusted identity associated with the first tenant.

6. The non-transitory computer-readable storage medium of clauses 1-5, having further computer-executable instructions stored thereupon which, when executed by the computer, cause the computer to:
   receive an access policy for one or more host resources, container resources, or virtual machine resources;
   receive an access request from the first tenant of the multi-tenant software container to utilize one or more of the host resources, container resources, or virtual machine resources, the access request comprising the trusted identity associated with the first tenant; and
   determine, based at least in part on the trusted identity associated with the first tenant and the access policy for the one or more host resources, whether to grant access to the one or more host resources, container resources, or virtual machine resources to the first tenant of the multi-tenant software container.

7. An apparatus for security isolation of tenants executing in a multi-tenant software container, the apparatus comprising:
   a processor; and
   a computer-readable storage medium having computer-executable instructions stored thereupon which, when executed by the processor, cause the apparatus to:
   receive a request to access a tenant of the multi-tenant software container from a client external to the multi-tenant software container,
   determine whether a trusted identity is required to perform the requested access the tenant of the multi-tenant software container,
   in response to determining that a trusted identity is required to perform the requested access, determine whether to grant the request for access received from the client external to the multi-tenant software container based at least in part on an access policy for the tenant and a trusted identity associated with the client received with the request to access the tenant, and
   in response to determining that a trusted identity is not required to perform the requested access, granting the request to access the tenant of the multi-tenant software container.

8. The apparatus of clause 7, wherein the computer-readable storage medium has further computer-executable instructions stored thereupon which, when executed by the processor, cause the apparatus to:
   associate a trusted identity with the tenant;
   receive an access policy for a second tenant in the multi-tenant software container;
   generate a request to access the second tenant, the request comprising the trusted identity associated with the tenant; and
   determine, based at least in part on the access policy for the second tenant and the trusted identity of the tenant, whether to grant the request to access the second tenant.

9. The apparatus medium of clauses 7-8, wherein a framework in the multi-tenant software container is configured to determine whether to grant the access request received from the first tenant and to grant the request for access received from the client.

10. The apparatus of clauses 7-9, wherein the second tenant is configured to determine whether to grant the access request received from the first tenant.

11. The apparatus of clauses 7-10, wherein the computer-readable storage medium has further computer-executable instructions stored thereupon which, when executed by the computer, cause the computer to:
   generate a request from the tenant to access a service external to the multi-tenant software container, the request comprising the trusted identity associated with the tenant, and
   wherein the service external to the multi-tenant software container is configured to determine whether to grant the access request received from the tenant based at least in part on the trusted identity associated with the first tenant.

12. The apparatus of clauses 7-11, wherein the computer-readable storage medium has further computer-executable instructions stored thereupon which, when executed by the computer, cause the computer to:
   receive an access policy associated with one or more resources;
   receive a request from the tenant to utilize one or more of the resources, the request comprising the trusted identity associated with the tenant; and
   determine, based at least in part on the trusted identity associated with the tenant and the access policy for the one or more resources whether to grant the request received from the tenant to access to the one or more resources.

13. The apparatus of clauses 7-12, wherein the access policy for the tenant, the access policy for the second tenant, and the access policy for the one or more resources are provided by a service external to the multi-tenant software container.

14. The apparatus of clauses 7-13, wherein the one or more resources comprise one or more host resources, container resources, or virtual machine resources.

15. A computer-implemented method for security isolation of tenants executing in a multi-tenant software container, the method comprising:
  associating a trusted identity with the tenants executing in the multi-tenant software container;
  generating an access request from a first tenant executing in the multi-tenant software container, the access request comprising the trusted identity associated with the first tenant; and
  determining whether to grant the access request generated by the first tenant based at least in part on an access policy and the trusted identity associated with the first tenant.

16. The computer-implemented method of clause 15, wherein the access request comprises a request to access a second tenant of the multi-tenant software container, and wherein a framework in the multi-tenant software container is configured to determine whether to grant the access request.

17. The computer-implemented method of clauses 15-16, wherein the access request comprises a request to access a second tenant of the multi-tenant software container, and wherein the second tenant is configured to determine whether to grant the access request.

18. The computer-implemented method of clauses 15-17, wherein the access request comprises a request to access a service external to the multi-tenant software container, and wherein the service external to the multi-tenant software container is configured to determine whether to grant the access request.

19. The computer-implemented method of clauses 15-18, wherein the access request comprises a request to access host resources, container resources, or virtual machine resources.

20. The computer-implemented method of clauses 15-19, further comprising:
  receiving a request to access a tenant of the multi-tenant software container from a client external to the multi-tenant software container, the request comprising a trusted identity associated with the client; and
  determining, based at least in part on an access policy for the tenant and the trusted identity associated with the client, whether to grant the request for access received from the client external to the multi-tenant software container.

Embodiments of the disclosure might also be described in view of the following additional clauses:

1. A non-transitory computer-readable storage medium having computer-executable instructions stored thereupon which, when executed by a computer, cause the computer to:
  execute a plurality of tenants in a multi-tenant software container; and
  implement one or more mechanisms for preventing a fault caused by one of the tenants of the multi-tenant software container from impacting another tenant of the multi-tenant software container, the mechanisms comprising one or more of
  preventing the tenants from shutting down the software container, a virtual machine, an operating system, or a host computer,
  limiting a number of active releases of each tenant executing in the software container, and
  restricting an ability of the tenants to execute native code.

2. The non-transitory computer-readable storage medium of clause 1, wherein the one or more mechanisms for preventing a fault caused by one of the tenants of the multi-tenant software container from impacting another tenant of the multi-tenant software container further comprise restricting an ability of the tenants to create new processes.

3. The non-transitory computer-readable storage medium of clauses 1-2, wherein the one or more mechanisms for preventing a fault caused by one of the tenants of the multi-tenant software container from impacting another tenant of the multi-tenant software container further comprise dynamically unloading a tenant from memory based upon utilization of the tenant.

4. The non-transitory computer-readable storage medium of clauses 1-3, wherein the one or more mechanisms for preventing a fault caused by one of the tenants of the multi-tenant software container from impacting another tenant of the multi-tenant software container further comprise:
  intercepting an error;
  determining a context of the error; and
  determining whether the error is to be allowed based upon the determined context.

5. The non-transitory computer-readable storage medium of clauses 1-4, wherein the one or more mechanisms for preventing a fault caused by one of the tenants of the multi-tenant software container from impacting another tenant of the multi-tenant software container further comprise preventing two of the plurality of tenants in a multi-tenant software container from utilizing the same uniform resource identifier (URI).

6. The non-transitory computer-readable storage medium of clauses 1-5, wherein the one or more mechanisms for preventing a fault caused by one of the tenants of the multi-tenant software container from impacting another tenant of the multi-tenant software container further comprise making objects passed between the tenants immutable.

7. The non-transitory computer-readable storage medium of clauses 1-6, wherein the one or more mechanisms for preventing a fault caused by one of the tenants of the multi-tenant software container from impacting another tenant of the multi-tenant software container further comprise preventing the tenants from making configuration changes to the software container, a virtual machine, an operating system, or the host computer.

8. An apparatus for preventing a fault caused by one of the tenants of the multi-tenant software container from impacting another tenant of the multi-tenant software container, the apparatus comprising:
  a processor; and
  a computer-readable storage medium having computer-executable instructions stored thereupon which, when executed by the processor, cause the apparatus to
  execute a plurality of tenants in a multi-tenant software container, and
  implement one or more mechanisms in conjunction with the execution of the plurality of tenants to prevent a fault from being caused by one of the tenants of the multi-tenant software container that would impact another tenant of the multi-tenant software container.

9. The apparatus of clause 8, wherein at least one of the mechanisms for preventing a fault from being caused by one of the tenants of the multi-tenant software container that would impact another tenant of the multi-tenant software container comprises preventing the tenants from shutting down the software container, a virtual machine, an operating system, or a host computer.

10. The apparatus of clauses 8-9, wherein at least one of the mechanisms for preventing a fault from being caused by one of the tenants of the multi-tenant software container that would impact another tenant of the multi-tenant software container comprises limiting a number of active releases of each tenant executing in the software container.

11. The apparatus of clauses 8-10, wherein at least one of the mechanisms for preventing a fault from being caused by one of the tenants of the multi-tenant software container that would impact another tenant of the multi-tenant software container comprises restricting an ability of the tenants to execute native code.

12. The apparatus of clauses 8-11, wherein at least one of the mechanisms for preventing a fault from being caused by one of the tenants of the multi-tenant software container that would impact another tenant of the multi-tenant software container dynamically unloading a tenant from memory based upon utilization of the tenant.

13. The apparatus of clauses 8-12, wherein at least one of the mechanisms for preventing a fault from being caused by one of the tenants of the multi-tenant software container that would impact another tenant of the multi-tenant software container comprises:
  intercepting an error;
  determining a context of the error; and
  determining whether the error is to be allowed based upon the determined context.

14. The apparatus of clauses 8-13, wherein at least one of the mechanisms for preventing a fault from being caused by one of the tenants of the multi-tenant software container that would impact another tenant of the multi-tenant software container comprises preventing two of the plurality of tenants in a multi-tenant software container from utilizing the same identifier.

15. A computer-implemented method for preventing a fault caused by one of the tenants of the multi-tenant software container from impacting another tenant of the multi-tenant software container, the method comprising:
  executing a plurality of tenants in a multi-tenant software container; and
  implementing one or more mechanisms for preventing a fault caused by one of the tenants of the multi-tenant software container from impacting another tenant of the multi-tenant software container.

16. The computer-implemented method of clause 15, wherein at least one of the one or more mechanisms for preventing a fault caused by one of the tenants of the multi-tenant software container from impacting another tenant of the multi-tenant software container comprises making one or more objects passed between the tenants immutable.

17. The computer-implemented method of clauses 15-16, wherein at least one of the one or more mechanisms for preventing a fault caused by one of the tenants of the multi-tenant software container from impacting another tenant of the multi-tenant software container comprises preventing the tenants from making configuration changes to the software container, to a virtual machine, to an operating system, or to a host computer executing the multi-tenant software container.

18. The computer-implemented method of clauses 15-17, wherein at least one of the one or more mechanisms for preventing a fault caused by one of the tenants of the multi-tenant software container from impacting another tenant of the multi-tenant software container comprises preventing the tenants from shutting down the software container, a virtual machine, an operating system, or a host computer.

19. The computer-implemented method of clauses 15-18, wherein at least one of the one or more mechanisms for preventing a fault caused by one of the tenants of the multi-tenant software container from impacting another tenant of the multi-tenant software container comprises limiting a number of active releases of each tenant executing in the software container.

20. The computer-implemented method of clauses 15-19, wherein at least one of the one or more mechanisms for preventing a fault caused by one of the tenants of the multi-tenant software container from impacting another tenant of the multi-tenant software container comprises restricting an ability of the tenants to execute native code.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
  monitor utilization of one or more resources of the computer by a plurality of tenants executing in a multi-tenant software container, the multi-tenant software container executing in a process on a virtual machine hosted by the computer, and the plurality of tenants executing as threads in the process, the monitoring based on one or more of bytecode weaving performed at a virtual machine level, interception performed at an operating system level, or shadow environments;
  determine, based upon the monitoring, that at least one tenant of the plurality of tenants is utilizing the one or more resources in excess of a specified threshold, wherein at least one of the resources comprises file descriptors, and wherein the determining comprises:
  maintaining a counter for individual ones of the plurality of tenants, the counter indicating a number of file descriptors created by a corresponding tenant, and
  determining that the counter for the at least one tenant exceeds a specified file descriptor threshold; and
  in response to determining that the at least one tenant is utilizing the one or more resources in excess of the specified threshold, perform one or more actions with regard to the at least one tenant that is utilizing the one or more resources in excess of the specified threshold.

2. The non-transitory computer-readable storage medium of claim 1, wherein the one or more resources comprise one or more of disk space, CPU cycles, system memory, permanent generation data, young generation data, old generation data, disk I/O operations, disk bandwidth, network I/O operations, network bandwidth, load balancer connections, file descriptors, processes, or execution threads.

3. The non-transitory computer-readable storage medium of claim 1, wherein the one or more actions comprise one or more of denying a resource request from the at least one tenant, redirecting a resource request from the at least one tenant to another multi-tenant software container, evicting the at least one tenant from the multi-tenant software container, moving the at least one tenant to another multi-tenant software container, reducing CPU cycles allocated to the at least one tenant, pausing execution of the at least one tenant, or throttling execution of the at least one tenant.

4. The non-transitory computer-readable storage medium of claim 1, wherein the monitoring is further based on one or more of memory dumps or tracing tools.

5. The non-transitory computer-readable storage medium of claim 1, having further computer-executable instructions stored thereupon which, when executed by the computer, cause the computer to execute the plurality of tenants in respective individual shadow environments in order to monitor the utilization of the one or more resources by individual ones of the plurality of tenants.

6. A system for isolating one or more resources for utilization by a plurality of tenants executing in a multi-tenant software container, the system comprising:
   a processor; and
      a computer-readable storage medium having computer-executable instructions stored thereupon which, when executed by the processor, cause the system to
      monitor utilization of the one or more resources of the system by the plurality of tenants executing in the multi-tenant software container, the multi-tenant software container executing in a process on a virtual machine hosted by the system, and the plurality of tenants executing as threads of the process, the monitoring based on one or more of bytecode weaving performed at a virtual machine level, interception performed at an operating system level, or shadow environments,
      determine, based upon the monitoring, that at least one tenant of the plurality of tenants utilizes the one or more resources in excess of a specified threshold, wherein at least one of the resources comprises file descriptors, and wherein the determining comprises:
         maintaining a counter for individual ones of the plurality of tenants, the counter indicating a number of file descriptors created by a corresponding tenant, and
         determining that the counter for the at least one tenant exceeds a specified file descriptor threshold; and
      in response to determining that the at least one tenant utilizes the one or more resources in excess of the specified threshold, perform one or more actions with respect to the at least one tenant of the plurality of tenants that utilizes the one or more resources in excess of the specified threshold.

7. The system of claim 6, wherein at least one of the resources comprises execution threads, and wherein the computer-readable storage medium has further computer-executable instructions stored thereupon which, when executed by the processor, cause the system to
   maintain a counter for individual ones of the plurality of tenants, the counter indicating a number of execution threads created by a corresponding tenant, and
   utilize the counter to prevent the corresponding tenant from creating execution threads in excess of a specified execution thread count.

8. The system of claim 7, wherein at least one counter is generated using one or more of bytecode weaving, interception, or tracing.

9. The system of claim 6, wherein at least one of the resources comprises execution threads, and wherein the computer-readable storage medium has further computer-executable instructions stored thereupon which, when executed by the processor, cause the system to
   maintain data identifying execution threads created by individual ones of the plurality of tenants, and
   utilize the data to reap execution threads created by a corresponding tenant if the corresponding tenant is removed from the multi-tenant software container.

10. The system of claim 6, wherein the computer-readable storage medium has further computer-executable instructions stored thereupon which, when executed by the processor, cause the system to
    associate a first directory on a file system with a tenant of the plurality of tenants, and
    prevent the tenant from writing to a second directory on the file system that is not associated with the tenant.

11. The system of claim 6, wherein the computer-readable storage medium has further computer-executable instructions stored thereupon which, when executed by the processor, cause the system to
    associate a disk quota with a tenant of the plurality of tenants, and
    prevent the tenant from writing an amount of data to a file system in excess of the disk quota associated with the tenant.

12. The system of claim 6, wherein at least one of the resources comprises memory, and wherein the computer-readable storage medium has further computer-executable instructions stored thereupon which, when executed by the processor, cause the system to
    maintain a counter for individual ones of the plurality of tenants, the counter indicating an amount of memory utilized by a corresponding tenant, and
    utilize the counter to prevent the corresponding tenant from utilizing memory in excess of a specified memory threshold.

13. The system of claim 12, wherein at least one counter is generated by bytecode weaving a virtual machine, and wherein the memory comprises one or more of permanent generation data, young generation data, or old generation data.

14. The system of claim 6, wherein the computer-readable storage medium has further computer-executable instructions stored thereupon which, when executed by the processor, cause the system to execute individual ones of the plurality of tenants in respective individual shadow environments in order to monitor the utilization of the one or more resources by individual ones of the plurality of tenants.

15. The system of claim 6, wherein the monitoring is further based on one or more of memory dumps or tracing tools.

16. A computer-implemented method for isolating utilization of one or more resources by a plurality of tenants executing in a multi-tenant software container, the method comprising:
    monitoring utilization of the one or more resources of a computer by the plurality of tenants executing in the multi-tenant software container, the multi-tenant software container executing in a process on a virtual machine hosted by the computer, and the plurality of tenants executing as threads in the process, the monitoring based on one or more of bytecode weaving performed at a virtual machine level, interception performed at an operating system level, or shadow environments;
    determining, based upon the monitoring, that at least one tenant of the plurality of tenants utilizes the one or more resources in excess of a specified threshold, wherein at least one of the resources comprises file descriptors, and wherein the determining comprises:
maintaining a counter for individual ones of the plurality of tenants, the counter indicating a number of file descriptors created by a corresponding tenant, and
determining that the counter for the at least one tenant exceeds a specified file descriptor threshold; and
in response to determining that the at least one tenant utilizes the one or more resources in excess of the specified threshold, performing one or more actions with respect to the at least one tenant of the plurality of tenants that utilizes the one or more resources in excess of the specified threshold.

17. The computer-implemented method of claim 16, wherein the monitoring is further performed by using one or more of, memory dumps or tracing tools.

18. The computer-implemented method of claim 16, wherein the one or more resources comprise one or more of disk space, CPU cycles, system memory, permanent generation data, young generation data, old generation data, disk I/O operations, disk bandwidth, network I/O operations, network bandwidth, load balancer connections, file descriptors, or execution threads.

19. The computer-implemented method of claim 16, wherein the one or more actions comprise one or more of denying a resource request from the at least one tenant, evicting the at least one tenant from the multi-tenant software container, reducing CPU cycles allocated to the at least one tenant, pausing execution of the at least one tenant, or throttling execution of the at least one tenant.

20. The computer-implemented method of claim 16, further comprising executing the plurality of tenants in respective individual shadow environments in order to monitor the utilization of the one or more resources by individual ones of the plurality of tenants.

* * * * *

UNITED STATES PATENT AND TRADEMARK OFFICE
CERTIFICATE OF CORRECTION

| | | |
|---|---|---|
| PATENT NO. | : 9,703,611 B1 | Page 1 of 1 |
| APPLICATION NO. | : 14/222564 | |
| DATED | : July 11, 2017 | |
| INVENTOR(S) | : Keian Christopher et al. | |

It is certified that error appears in the above-identified patent and that said Letters Patent is hereby corrected as shown below:

In the Claims

Column 45, Line 17, change "more of, memory" to -- more of memory --.

Signed and Sealed this
Third Day of October, 2017

Joseph Matal
*Performing the Functions and Duties of the*
*Under Secretary of Commerce for Intellectual Property and*
*Director of the United States Patent and Trademark Office*